US012512961B2

(12) United States Patent
Bajpeyi et al.

(10) Patent No.: US 12,512,961 B2
(45) Date of Patent: *Dec. 30, 2025

(54) MULTI-MODAL CRYPTOGRAPHIC PROCESSOR

(71) Applicant: THE GOVERNING COUNCIL OF THE UNIVERSITY OF TORONTO, Toronto (CA)

(72) Inventors: Shaveer Bajpeyi, Toronto (CA); Glenn Gulak, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 66 days.

This patent is subject to a terminal disclaimer.

(21) Appl. No.: 18/388,687

(22) Filed: Nov. 10, 2023

(65) Prior Publication Data

US 2024/0235810 A1 Jul. 11, 2024

Related U.S. Application Data

(63) Continuation of application No. 18/081,078, filed on Dec. 14, 2022, now Pat. No. 11,818,244.

(60) Provisional application No. 63/289,783, filed on Dec. 15, 2021.

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ......... H04L 9/008; H04L 9/0618; H04L 9/00; H04L 9/06
See application file for complete search history.

(56) References Cited

U.S. PATENT DOCUMENTS

2009/0202067 A1* 8/2009 Michaels ................ G06F 7/584
708/492
2023/0027423 A1* 1/2023 Rao ........................ G06F 7/5443

* cited by examiner

*Primary Examiner* — Quazi Farooqui
(74) *Attorney, Agent, or Firm* — Lance Kreisman; Peninsula Patent Group

(57) ABSTRACT

Cryptographic processor chips, systems and associated methods are disclosed. In one embodiment, a cryptographic processor is disclosed. The cryptographic processor includes a first cryptographic processing module to perform a first logic operation. The first cryptographic processing module includes first input circuitry to receive ciphertext input symbols. A first pipeline stage performs a first operation on the ciphertext input symbols and generates a first stage output. On-chip memory temporarily stores the first stage output and feeds the first stage output to a second pipeline stage in a pipelined manner. The second pipeline stage is configured to perform a second operation on the first stage output in a pipelined manner with respect to the first pipeline stage.

19 Claims, 21 Drawing Sheets

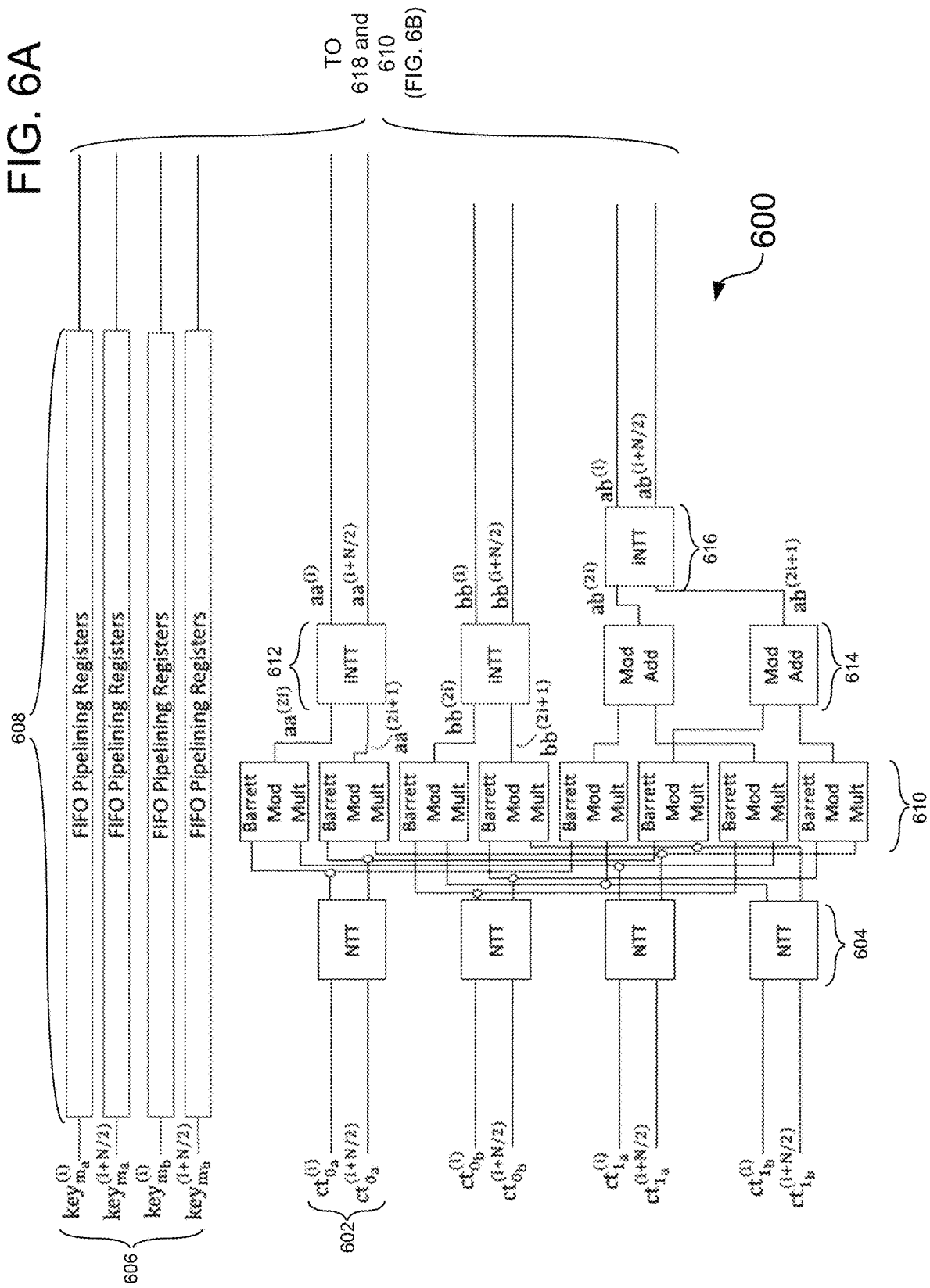

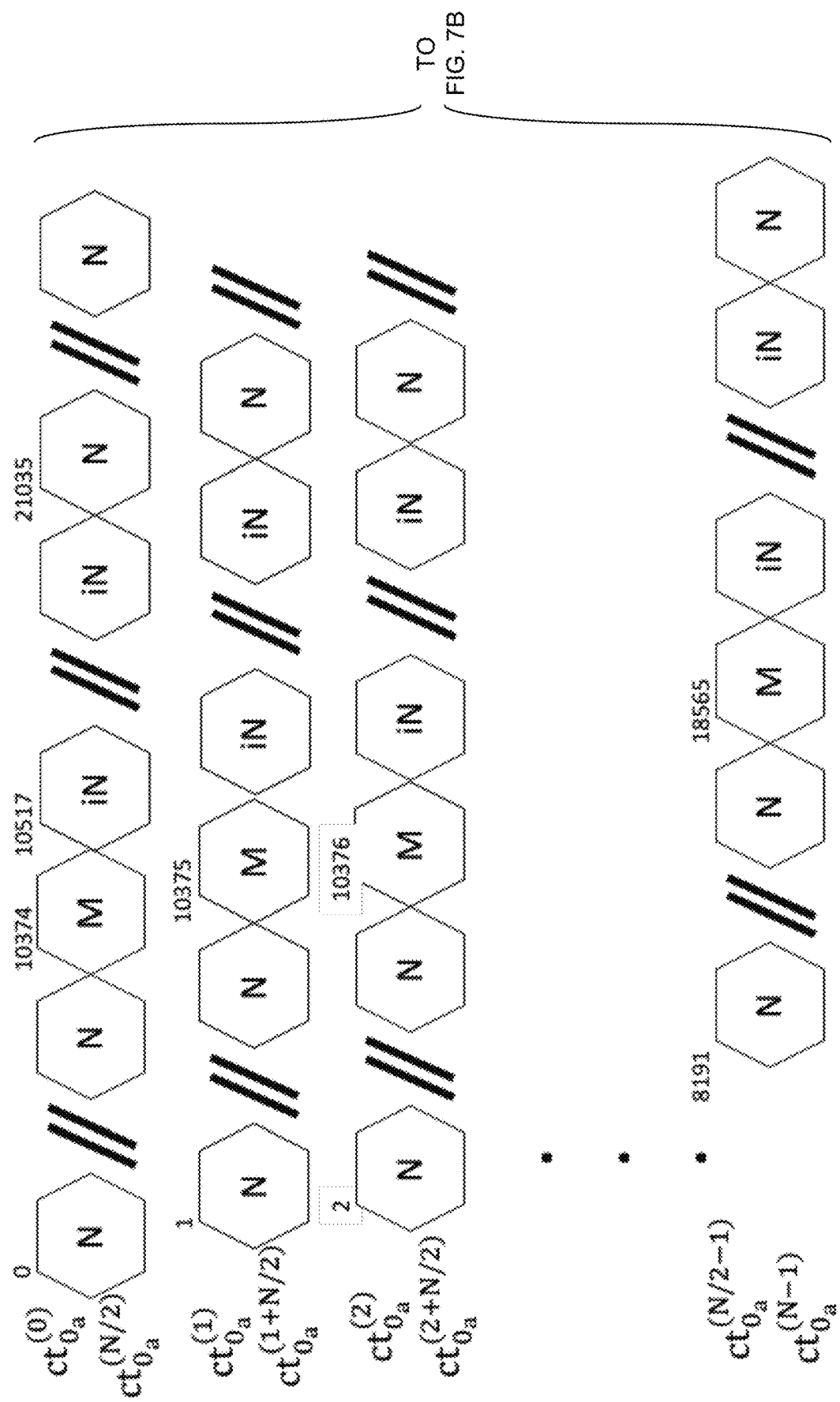

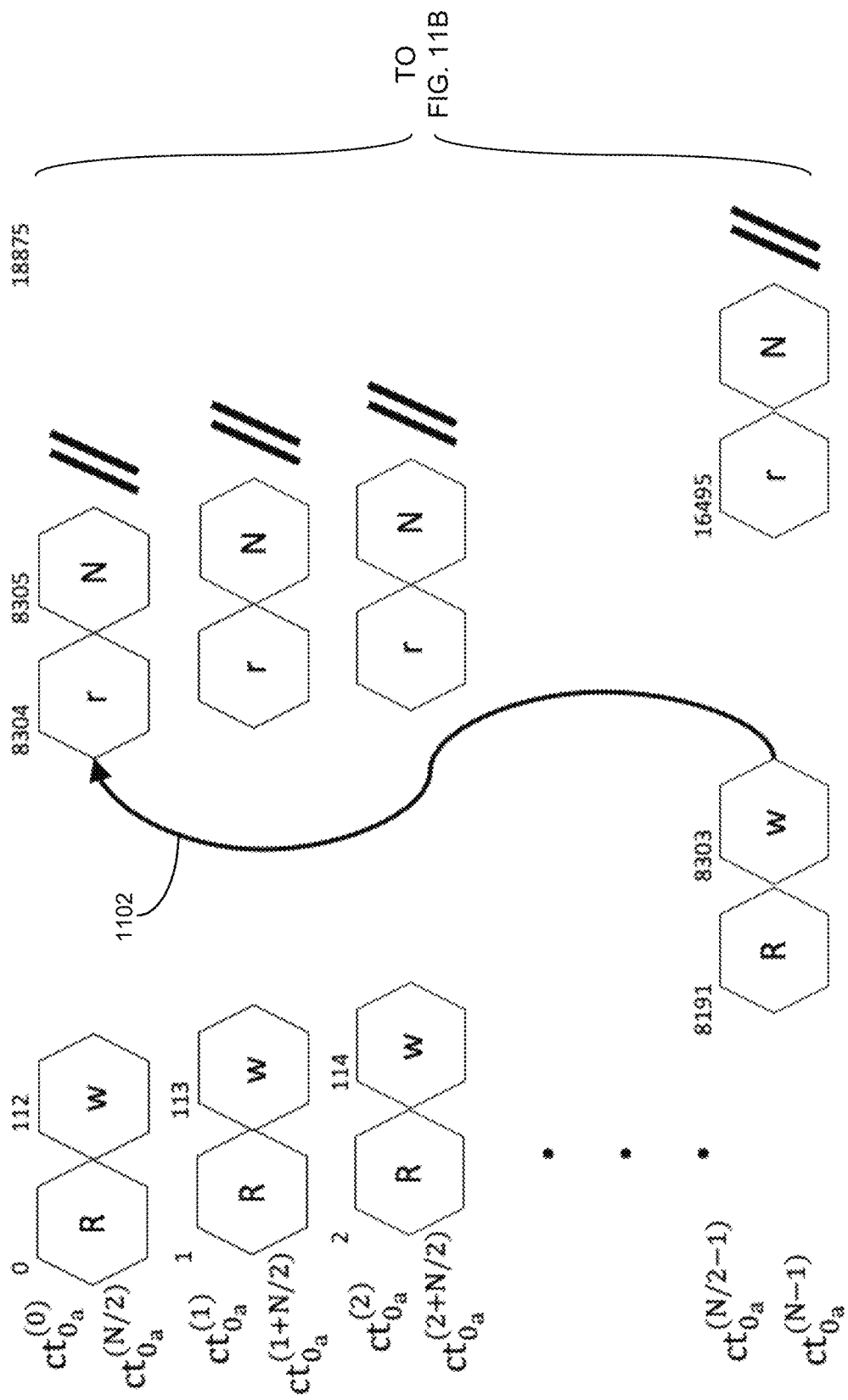

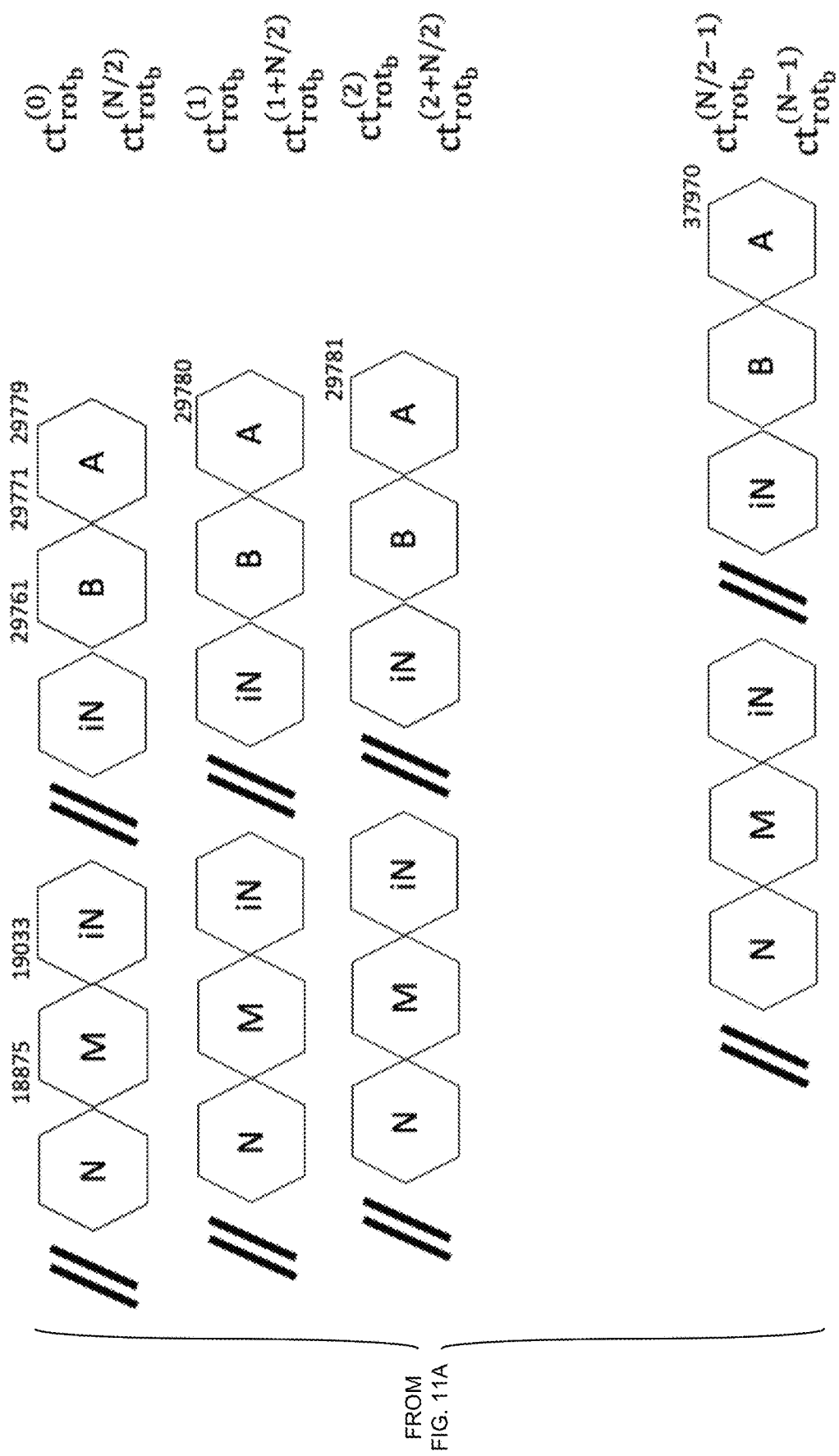

MULTI-MODAL CRYPTOGRAPHIC PROCESSOR

CROSS-REFERENCE TO RELATED APPLICATIONS

This application is a Continuation that claims priority to U.S. application Ser. No. 18/081,078, filed Dec. 14, 2022, entitled CRYPTOGRAPHIC PROCESSOR FOR FULLY HOMOMORPHIC ENCRYPTION (FHE) APPLICATIONS, which is a Non-Provisional that claims priority to U.S. Provisional Application No. 63/289,783, filed Dec. 15, 2021, entitled CRYPTOGRAPHIC PROCESSOR FOR FULLY HOMOMORPHIC ENCRYPTION (FHE) APPLICATIONS, all of which are incorporated herein by reference in their entirety.

TECHNICAL FIELD

The disclosure herein relates to cryptographic processors, and more particularly homomorphic encryption processors and associated methods.

BACKGROUND

Fully homomorphic encryption (FHE) provides the ability for a third party to carry out computations on encrypted data without having to first decrypt the data. This form of encryption allows users to store their private encrypted data on, for example, a remote server, while enabling the data storage facility to process the encrypted data. Fully homomorphic encryption lends itself well to a cloud-based computing environment.

While offering great promise by preserving privacy for data owners, operations involving encrypted data are nevertheless computation-intensive.

SUMMARY

Cryptographic processor chips, systems and associated methods are disclosed. In one embodiment, a cryptographic processor is disclosed. The cryptographic processor includes a first cryptographic processing module to perform a first logic operation. The first cryptographic processing module includes first input circuitry to receive ciphertext input symbols from on-chip memory. A first pipeline stage performs a first operation on the ciphertext input symbols and generates a first stage output. The first stage output is fed to a second pipeline stage in a pipelined manner. The second pipeline stage is configured to perform a second operation on the first stage output in a pipelined manner with respect to the first pipeline stage. Constants for use in performing operations are stored in on-chip memory associated with each pipeline stage. By employing multiple stages that cooperate with on-chip memory, the first cryptographic processing module is capable of performing ciphertext processing, such as ciphertext multiplication, rotation and addition in a fully-pipelined manner. This capability significantly reduces the processing time to carry out ciphertext operations to a level similar to processing times associated with non-ciphertext operations.

In another embodiment, the first input circuitry of the cryptographic processor receives the ciphertext input symbols synchronous with an instruction clock signal, and wherein a new set of input ciphertext symbols are presented to the first input circuitry each cycle of the instruction clock signal.

In yet another embodiment, the first cryptographic processing module is configured to perform ciphertext multiplication operations, ciphertext rotation operations or ciphertext addition operations.

In a further embodiment, the storage circuitry includes an input interface that is configured with a bit-width to receive at least one entire ciphertext or key coefficient per cycle of a system clock.

In another embodiment, the cryptographic processor further includes at least one Chinese Remainder Theorem (CRT) processing stage.

In yet another embodiment, the first cryptographic processing module is configured as a Residue Number System (RNS) architecture.

In a further embodiment, the first cryptographic processing module includes multiple processing slices defining multiple processing channels, each channel to perform operations on signals 64-bits wide or less concurrently with the other processing channels.

In another embodiment, the first cryptographic processing module is configured as a Large Arithmetic Word Size (LAWS) architecture.

In a further embodiment, the first cryptographic processing module includes a single processing slice defining a single processing channel to perform operations on signals that are more than 64-bits wide.

In yet another embodiment, the cryptographic processor further includes a second processing module to perform a second logic operation different than the first logic operation.

In another embodiment, the storage circuitry includes on-chip register circuitry configured to temporarily store the input of each stage.

In a further embodiment, the first cryptographic processing module produces outputs with a pre-determined latency of execution cycles and constant throughput.

In yet another embodiment, the first pipeline stage comprises a stage of number theoretic transform (NTT) circuits to perform an NTT operation as the first operation. The stage of NTT circuits are configured to exhibit a predetermined parallelism. The second pipeline stage is configured to employ a number of inputs and outputs that match the predetermined parallelism of the stage of NTT circuits.

In a further embodiment, a cryptographic processor includes a first cryptographic processing module having first input circuitry to receive ciphertext input symbols. A number theoretic transform (NTT) stage performs an NTT operation on the received ciphertext input symbols and generates an NTT stage output. The NTT stage is configured to exhibit a predetermined parallelism. A second circuit stage receives the NTT stage output in a pipelined manner. The second pipeline stage is configured to employ a number of inputs and outputs that matches the predetermined parallelism of the NTT circuit.

In another embodiment, the first input circuitry receives the ciphertext input symbols synchronous with an instruction clock signal. A new set of input ciphertext symbols are presented to the first input circuitry each cycle of the instruction clock signal.

In yet another embodiment, the first cryptographic processing module is configured to perform ciphertext addition or ciphertext multiplication operations or ciphertext rotation operations.

In a further embodiment, the first cryptographic processing module is configured as a Residue Number System (RNS) architecture and includes multiple processing slices defining multiple processing channels, each channel to perform operations on signals 64-bits wide or less concurrently with the other processing channels.

In another embodiment, the first cryptographic processing module is configured as a Large Arithmetic Word Size (LAWS) architecture and includes a single processing slice defining a single processing channel to perform operations on signals that are more than 64-bits wide.

In yet another embodiment, the first cryptographic processing module produces outputs with a pre-determined latency of execution cycles and constant throughput.

In a further embodiment, a method of operation in a cryptographic processor includes receiving ciphertext input symbols with first input circuitry; performing a number theoretic transform (NTT) operation on the received ciphertext input symbols with an NTT stage and generating an NTT stage output, the NTT stage configured to exhibit a predetermined parallelism; and receiving the NTT stage output in a pipelined manner with a second pipeline stage. The second pipeline stage is configured to employ a number of inputs and outputs that matches the predetermined parallelism of the NTT circuit.

In yet another embodiment, an integrated circuit (IC) chip includes processing circuitry to perform a processing operation on an input ciphertext. On-chip storage is coupled to the processing circuitry via a transfer interface. The transfer interface exhibits a predetermined bit width that is configured to deliver at least one entire ciphertext or key coefficient per cycle to the processing circuitry.

For one embodiment, the on-chip storage takes the form of embedded static random access memory (SRAM).

In another embodiment, the on-chip storage further includes a memory interface that is configured with a bit-width matching the predetermined bit width for communicating with external storage. The on-chip storage receives a second set of input ciphertexts and/or key coefficients from the external storage via the memory interface concurrent with transferring a first set of ciphertexts and/or key coefficients per cycle to the processing circuitry.

In a further embodiment, the external storage comprises at least one High Bandwidth Memory (HBM) device.

In yet a further embodiment, the on-chip storage is configured to store a subset of roots and inverse roots of unity for synchronous transformations. Additional roots of unity are generated by the processing circuitry as modular products of the stored subset of roots.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 6A illustrates a first portion of one embodiment of a Large Arithmetic Word Size (LAWS) ciphertext multiplication module corresponding to the ciphertext multiplication module of FIG. 1.

FIG. 7A illustrates a first portion of a pipeline timing diagram corresponding to the ciphertext multiplication module shown in FIGS. 6A and 6B.

FIG. 11A illustrates a first portion of a pipeline timing diagram corresponding to the ciphertext rotation module shown in FIGS. 10A and 10B.

FIG. 11B illustrates a second portion of the pipeline timing diagram of FIG. 11A.

DETAILED DESCRIPTION

Figure 1:
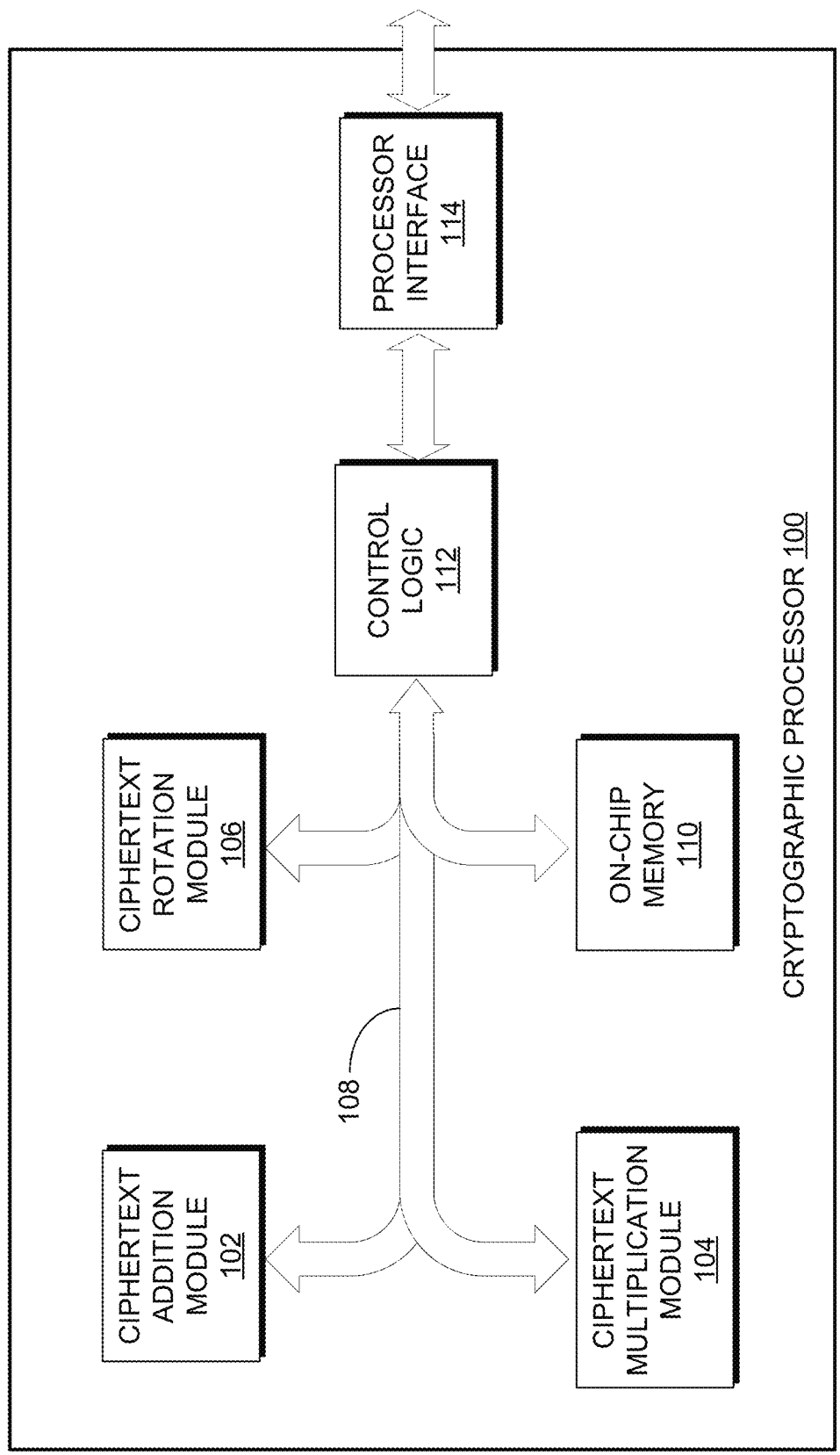
FIG. 1 illustrates one embodiment of an integrated circuit (IC) cryptographic processor to carry out fully homomorphic encryption (FHE) processing.

Referring to FIG. 1, one embodiment of an integrated circuit (IC) cryptographic processor, generally designated 100, employs an on-chip ciphertext (Ctxt) addition module 102, a ciphertext multiplication module 104, and a ciphertext rotation module 106 coupled to an on-chip bus 108. On-chip memory 110 is provided to temporarily store and feed data to the computing modules in a manner that, for one embodiment, enables fully-pipelined operations for each module. In some embodiments, the on-chip memory 108 employs a memory interface that is at least as wide as an input ciphertext or key coefficient. For some embodiments, the bus 108 exhibits a bit-width that matches a bit-width of the memory interfaces associated with the on-chip memory 110. In addition, the cryptographic processor 100 employs control logic 112 to orchestrate module operation and to control data transfers to and from an external entity via processor interface 114. This general architecture provides a cycle accurate cryptographic processor that offers hardware acceleration for the computation of homomorphic operations that provides processing rates similar to processing rates associated with non-encrypted operations.

As more fully described below, for one embodiment, the ciphertext addition, multiplication and rotation modules are configured as fully-pipelined modules, where ciphertext data is processed each instruction clock cycle. While the ciphertext addition module generally employs a single stage of circuitry, the ciphertext multiplication and rotation modules employ multiple stages of circuitry that cooperate with the on-chip memory to operate in a fully-pipelined manner. For one embodiment, to feed input ciphertext and/or key coefficient operands into the fully-pipelined modules at a sufficient bandwidth to support the fully-pipelined architecture, the memory interfaces of the on-chip memory 110 are configured to deliver at least one entire ciphertext or key coefficient per pipeline cycle.

A ciphertext may be represented as a pair of polynomials, each of the form $c_0X^0+c_1X^1+\ldots+C_{N-1}X^{N-1}$, where each coefficient c; is an element of $\mathbb{Z}_q$. We denote $(ct_a, ct_b)$ as the pair of polynomials for the ciphertext ct, $(key_{m_a}, key_{m_b})$ as the pair of polynomials for the multiplication key $key_m$, and $(key_{r_a}, key_{r_b})$ as the pair of polynomials for the rotation key $key_r$. While ciphertext coefficients are modulo q, when using a Cheon-Kim-Kim-Song (CKKS) scheme, key polynomial coefficients are modulo $Q=q^2$. For Residue Number System (RNS) embodiments, a Chinese Remainder Theorem (CRT) function is used to transform coefficients to the RNS domain of np parallel channels for coefficients modulus q and $np_{key}$ parallel channels for coefficients modulus Q. Note that the RNS basis of np co-prime moduli $\{p_0, p_1, \ldots, p_{np-1}\}$ is a subset of the basis of $np_{key}$ co-prime moduli $\{p_0, p_1, \ldots, p_{np_{key}-1}\}$, as $np_{key}>np$. For all stated bit sizes and cycle counts we employ, without loss of generality, encryption parameters N=16,384 as the polynomial modulus degree and $\log_2 q$=500, rounded to 512 bits, as the polynomial coefficient modulus. However, the presented RNS and LAWS design embodiments are translatable to other encryption parameters, where N is a power of two and the value of q is dictated by the desired level of security, commonly specified by the security parameter $\lambda$.

In various module embodiments described below, input ciphertexts may generally be represented by the symbols $ct_0$ and $ct_1$, and comprise polynomial pairs $(ct_{0_a}, ct_{0_b})$ and $(ct_{1_a}, ct_{1_b})$, respectively, that represent encrypted messages or intermediate computations of an arbitrary algorithm to be applied on FHE data such as a machine learning model or search algorithm. The variables represented by the ciphertexts $ct_0$ and $ct_1$ in the implemented algorithm may depend on the location of the module within the circuit implementing the algorithm.

For some embodiments, such as those illustrated in FIGS. 4A-4B and 6A-6B, multiplication keys represented by the symbol $key_m$, with polynomials $(key_{m_a}, key_{m_b})$ may be invariant for all multiplication modules. Similarly, for embodiments such as those illustrated in FIGS. 8A-8B and 10A-10B, rotation keys represented by the symbol $key_r$, with polynomials $(key_{r_a}, key_{r_b})$ may be invariant for all rotation modules implementing a rotation of r slots.

Figure 2:
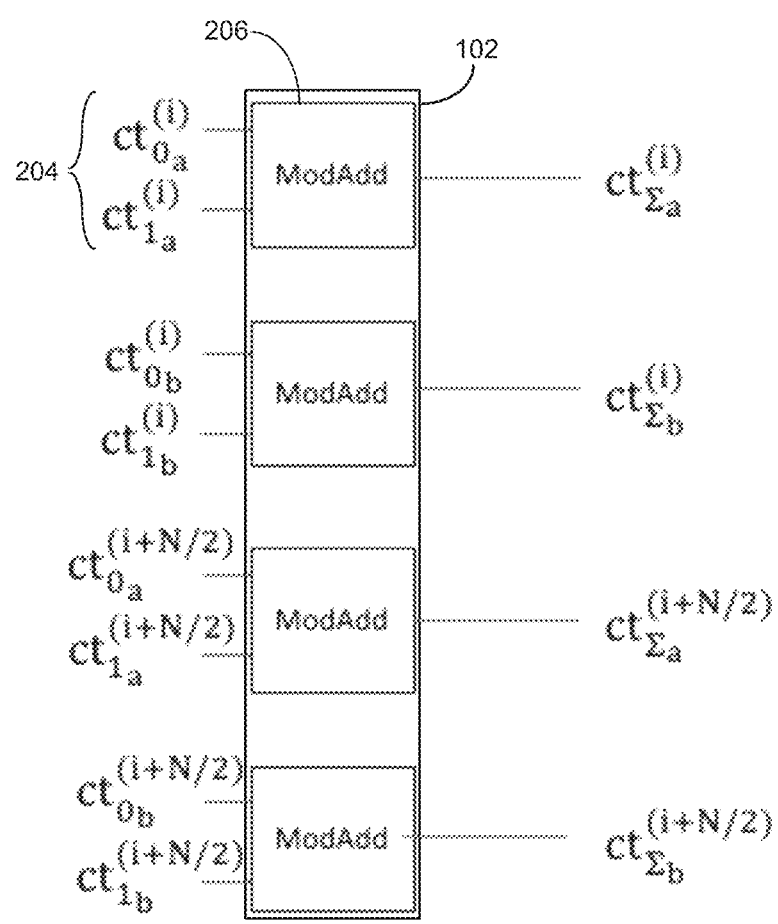
FIG. 2 illustrates one embodiment of the ciphertext addition module of FIG. 1.

FIG. 2 illustrates one embodiment of a ciphertext addition module 102 corresponding to that shown in FIG. 1. Ciphertext addition may be defined by Relationship 1 below, and generally utilizes coefficient-wise modular additions of corresponding polynomials in each ciphertext. The relationship is the same for both RNS and Large Arithmetic Word Size (LAWS) architectures. In all Relationships, the bit size of each operation is listed in the right margin. Two input indices from each input polynomial, such as at 204, are processed in parallel to mirror the input structure of a Numeric Theoretic Transform (NTT) function in the ciphertext addition and rotation functions, where $0 \leq i < N/2$. Note that the two coefficients 204 from each polynomial are processed in parallel by a modular addition circuit 206, which is done throughout the whole system to throughput match the NTT and Inverse Numeric Theoretic Transform (iNTT) blocks in the ciphertext multiplication and rotation functions. The first coefficient input to the ciphertext addition function has index i=0 and is paired with coefficient index i+N/2=8192, and each cycle the coefficient index is increased by 1 ($i \leftarrow i+1$) as a new coefficient pair from each of the polynomials is read. All indices are separated by N/2 to satisfy the required input pattern for the first stage of an NTT circuit. For one embodiment the ciphertext addition module temporarily stores a single constant in on-chip memory (not shown). The constant is used in the addition process.

| Relationship 1: Ciphertext Addition |
|---|
| Inputs: $ct_0 = (ct_{0_a}, ct_{0_b})$, $ct_1 = (ct_{1_a}, ct_{1_b})$, q |
| Outputs: $ct_\Sigma = (ct_{\Sigma_a}, ct_{\Sigma_b})$ |
| 1  $ct_{\Sigma_a} \leftarrow$ ModAdd of $ct_{0_a}$ and $ct_{1_a}$ mod q     [512b] |
| 2  $ct_{\Sigma_b} \leftarrow$ ModAdd of $ct_{0_b}$ and $ct_{1_b}$ mod q     [512b] |

Figure 3:
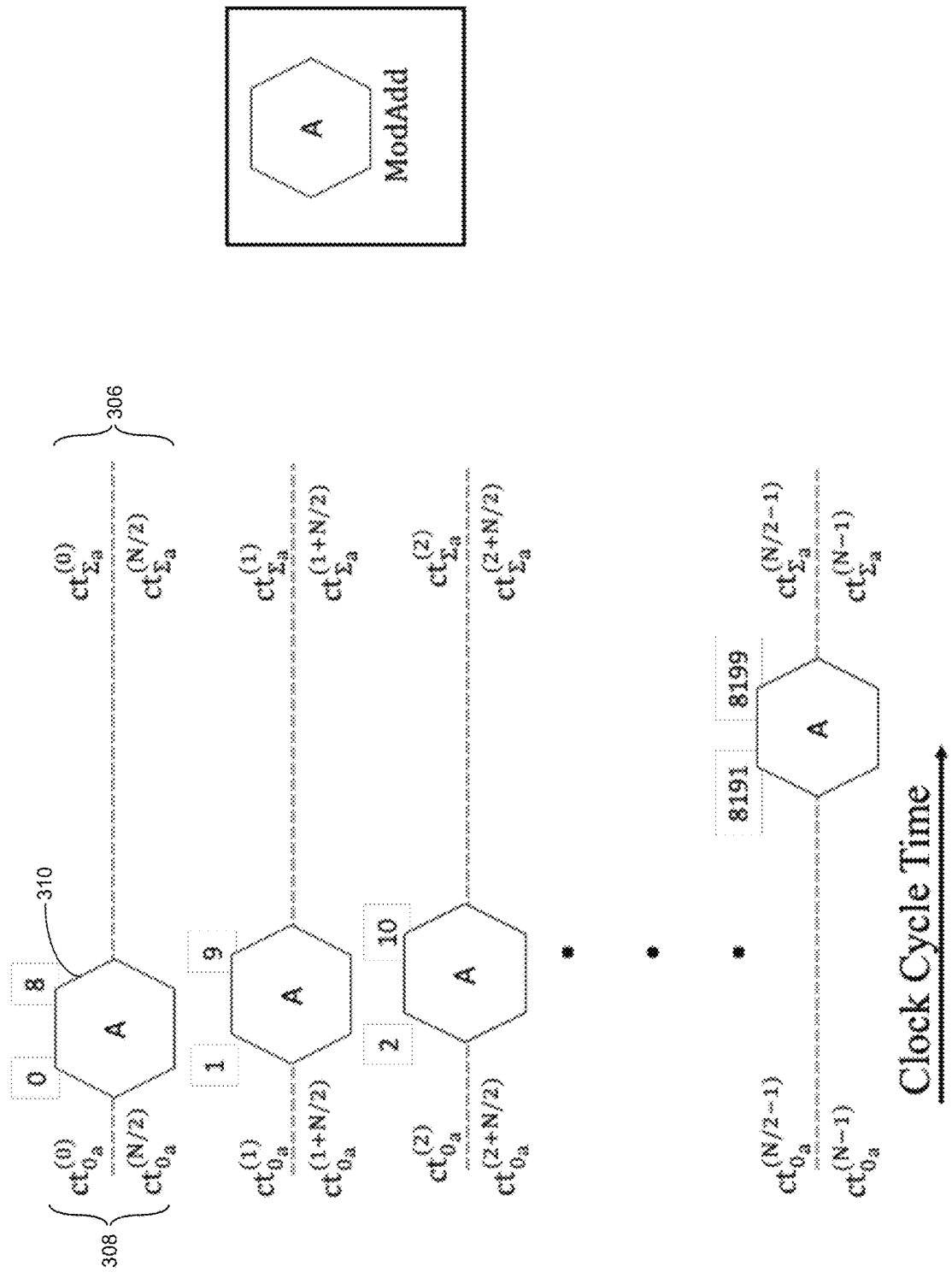
FIG. 3 illustrates a pipeline timing diagram corresponding to the ciphertext addition module shown in FIG. 2.

FIG. 3 illustrates a pipeline diagram for a critical latency associated with the ciphertext addition module 102 of FIG. 2. For each processor cycle, indicated by the numerals 0-8199, a new coefficient pair is read and, after a latency of 9 cycles (determined by the ModAdd block), a coefficient pair is produced, such as at 306. As all inputs in the ciphertext addition function in FIG. 3, such as at 308, are processed in parallel, $ct_{0_a}$ is arbitrarily chosen to represent the critical latency. As shown in FIG. 3, the ciphertext addition module 102 has a throughput of four coefficients per cycle and a latency of 9 cycles. The latency is entirely dependent on the pipelined modular addition block. Note that FIG. 3 illustrates the path of the coefficients through the function in FIG. 3, such as at 310, and not the actual inputs of the functions themselves as in FIG. 2. The coefficient pair, such as at 308, is included in FIG. 3 to illustrate that the input coefficients fed to the first stage of an NTT circuit are generally processed in parallel.

Figure 4A:
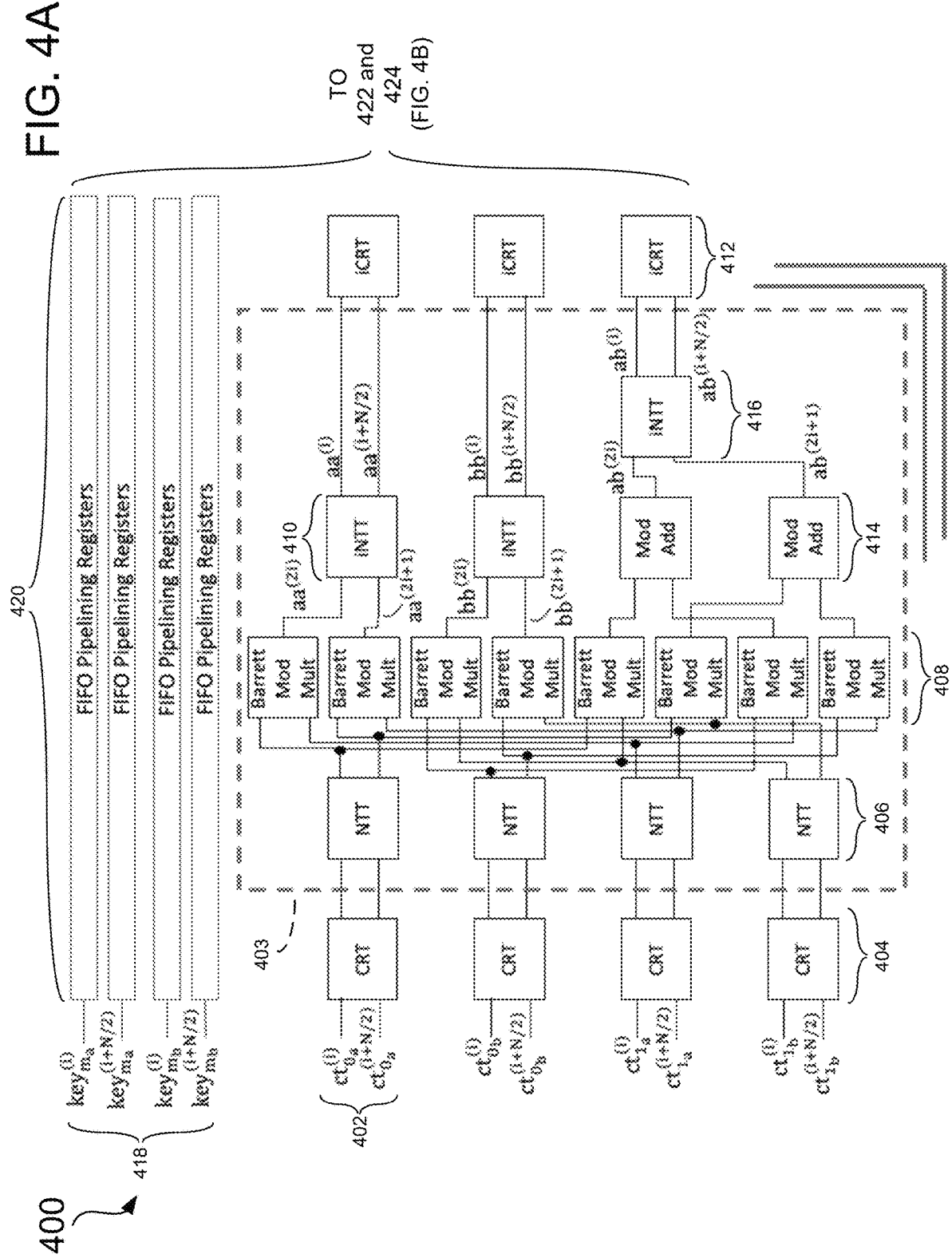
FIG. 4A illustrates a first portion of one embodiment of a Residue Number System (RNS) ciphertext multiplication module corresponding to the ciphertext multiplication module of FIG. 1.

Referring now to FIG. 4A, one embodiment of a ciphertext multiplication module 400 is shown that corresponds to the ciphertext multiplication module 104 of FIG. 1. For an RNS embodiment, ciphertext multiplication may be defined by Relationship 2a below, which corresponds to the hardware stages shown in FIGS. 4A and 4B. Two input indices, such as at 402, from each input polynomial are processed in parallel to match a throughput of an NTT function provided by a stage of NTT circuits 406, where $0 \leq i < N/2$. For some embodiments, there are np or $np_{key}$ copies of all NTT, iNTT, and multiplier modules, such as BarrettModMult modules 408, and the modules within the dashed boxes, at 403 and 425, represent a single copy of a specified number of parallel copies. In some embodiments, all CRT modules, such as at 404 and 424 (FIG. 4B) produce np or $np_{key}$ copies of each output and all iCRT modules, such as at 412 and 432, employ np or $np_{key}$ copies of each input. The RNS implementation of the ciphertext multiplication function produces four output coefficients, at 436, or two output coefficients per output polynomial, per cycle. Roots of unity and other constants required for the modules shown are stored in eSRAMs, which are not shown but represented by a Distributed eSRAM module 427 (FIG. 4B).

Further referring to FIG. 4A, a given stage of CRT circuits 404 receives the input indices 402 and performs a CRT function on the indices, including a conversion to the RNS domain. The result is fed to the first stage of NTT circuits 406. An NTT operation is performed on each polynomial, followed by a multiplication by the stage of Barrett module multiplier circuits 408. For a first subset of the indices, the results of the Barrett multiplications are fed to a stage of inverse NTT modules 410 that perform an inverse NTT function before passing the results to a stage of inverse CRT circuits 412. For a second subset of the indices, the results of the Barrett multiplications are fed to a stage of modular adder circuits 414, which feed an inverse NTT circuit 416. The results of the iNTT circuit are then fed to the iCRT circuits 412. While the input indices are being processed through the various stages, a set of input keys, at 418, are temporarily queued, such as in FIFO pipeline registers 420.

Figure 4B:
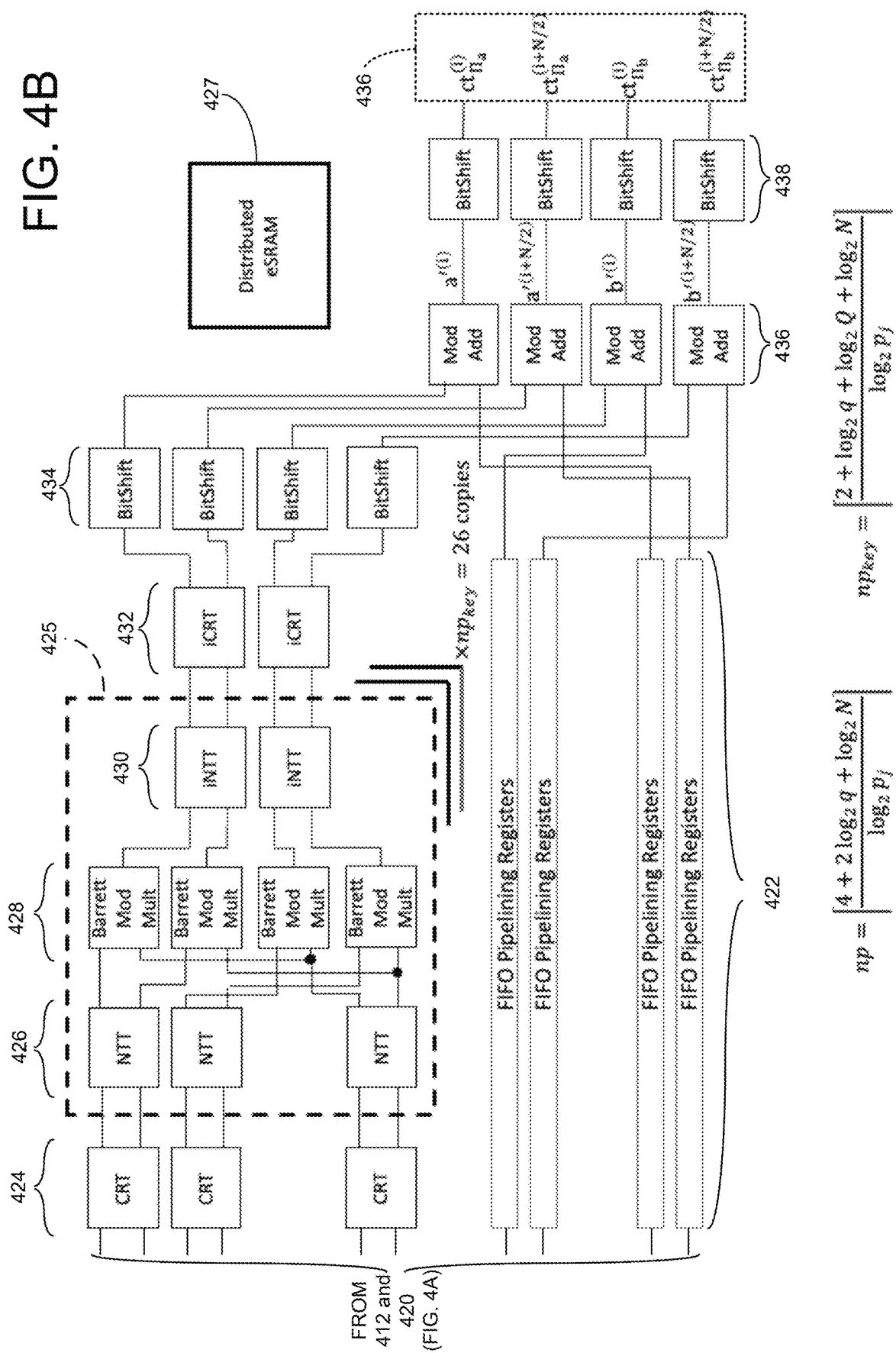
FIG. 4B illustrates a second portion of the Residue Number System (RNS) ciphertext multiplication module of FIG. 4A.

Referring now to FIG. 4B, following being temporarily stored in the FIFO pipelining registers 420, the set of input keys is fed to a second stage of CRT circuits 424. On the same processor cycle, a first subset of the input indices is fed from the stage of iCRT circuits 412 to the second stage of CRT circuits 424 for parallel processing with the input keys. The remaining outputs from the iCRT circuits 412 are fed into a second set of FIFO pipelining registers 422. Similar to the processing of the input indices described above, an NTT operation is performed by the second stage of NTT circuits 426 on the input key and lone set of indices, followed by a multiplication by a second stage of Barrett module multiplier circuits 428. The results of the Barrett multiplications are fed to a second stage of inverse NTT modules 430 that perform an inverse NTT function before passing the results to a second stage of inverse CRT circuits 432. The results generated by the second stage of iCRT circuits 432 is provided to a stage of bit shift modules 434, which then provide bit-shifted results to a stage of modular adders 436. Also provided to the stage of modular adders 436 are the queued outputs from the FIFO pipelining registers 422.

Further referring to FIG. 4B, the stage of modular adder circuits 436 performs an addition function and feeds its results to a second stage of bit shift circuits 438. The stage of bit shift circuits 438 performs a bit shift operation to generate the resulting multiplier outputs. Relationship 2a below provides a more detailed functional description of how the circuitry of FIGS. 4A and 4B operate.

| Relationship 2a: RNS Ciphertext Multiplication |
| --- |
| Inputs: $ct_0 = (ct_{0_a}, ct_{0_b})$, $ct_1 = (ct_{1_a}, ct_{1_b})$, q, Q, $key_m =$ $(key_{m_a}, key_{m_b})$, L, np, $np_{key}$, p, $\{p_0, p_1, ..., p_{np-1}, ..., p_{np_{key}-1}\}$ |
| Outputs: $ct_\Pi = (ct_{\Pi_a}, ct_{\Pi_b})$ |
| Perform a CRT on each coefficient of $ct_{0_a}$, $ct_{0_b}$, $ct_{1_a}$ and $ct_{1_b}$ to convert to the RNS domain with basis $\{p_0, p_1, ..., p_{np-1}\}$.    [512b] |
| for (j = 0; j < np; j ← j + 1) |
|   Perform an NTT on each polynomial $ct_{0_a}[j]$, $ct_{0_b}[j]$, $ct_{1_a}[j]$ and $ct_{1_b}[j]$    [64b] |
|   aa[j] ← Coefficient-wise BarrettModMult of $ct_{0_a}[j]$ and $ct_{1_a}[j]$ mod $p_j$    [64b] |
|   bb[j] ← Coefficient-wise BarrettModMult of $ct_{0_b}[j]$ and $ct_{1_b}[j]$ mod $p_j$    [64b] |
|   AB[j] ← Coefficient-wise BarrettModMult of $ct_{0_a}[j]$ and $ct_{1_b}[j]$ mod $p_j$    [64b] |
|   BA[j] ← Coefficient-wise BarrettModMult of $ct_{0_b}[j]$ and $ct_{1_a}[j]$ mod $p_j$    [64b] |
|   ab[j] ← ModAdd of AB[j] and BA[j] mod $p_j$    [64b] |
|   Perform an iNTT on each polynomial aa[j], bb[j] and ab[j]    [64b] |
| Perform an iCRT to reconstruct each coefficient of aa, bb, and ab with |

| Relationship 2a: RNS Ciphertext Multiplication |
| --- |
| modulus q using all np channels of aa[0: np − 1], bb[0: np − 1], and ab[0: np − 1],    [512b] |
| Perform a CRT on each coefficient of aa, $key_{m_a}$, and $key_{m_b}$ to convert to the RNS domain with basis $\{p_0, p_1, ..., p_{np_{key}-1}\}$.    [1,024b] |
| for (j = 0; j < $np_{key}$; j ← j + 1) |
|   Perform an NTT on each polynomial aa[j], $key_{m_a}[j]$ and $key_{m_b}[j]$    [64b] |
|   a'[j] ← Coefficient-wise BarrettModMult of aa[j] and $key_{m_a}[j]$ mod $p_j$    [64b] |
|   b'[j] ← Coefficient-wise BarrettModMult of aa[j] and $key_{m_b}[j]$ mod $p_j$    [64b] |
|   Perform an iNTT on each polynomial a'[j] and b'[j]    [64b] |
| Perform an iCRT to reconstruct each coefficient of a' and b' with modulus Q using all $np_{key}$ channels of a'[0: $np_{key}$ − 1]    [1,024b] |
| and b'[0: $np_{key}$ − 1]. |
| a' ← a' ≫ L    [1,024b] |
| b' ← b' ≫ L    [1,024b] |
| a' ← ModAdd of a' and ab mod q    [512b] |
| b' ← ModAdd of b'and bb mod q    [512b] |
| $ct_{\Pi_a}$ = a' ≫ $\log_2$ p    [512b] |
| $ct_{\Pi_b}$ = b' ≫ $\log_2$ p    [512b] |

For an RNS-based architectural implementation, ciphertext multiplication generally involves first converting all polynomials into the RNS and NTT domains to perform polynomial multiplications. Referring to Relationship 2a, all operations within both for loops are 64-bit operations and are performed across np channels for the first iteration of the "for" loop involving the np channels, and $np_{key}$ channels for the second iteration of the "for" loop. As the ciphertext polynomials and key polynomials have different coefficient moduli, a conversion out of the RNS domain with a basis of np primes and a conversion into the larger RNS domain with a basis of $np_{key}$ primes is performed for the polynomial aa before it can be multiplied with the key polynomials. Here, the basis of np primes is a subset of the basis with $np_{key}$ primes.

Further referring to FIGS. 4A and 4B, as operations across RNS channels are independent, it is possible to perform each iteration of the "for" loops of Relationship 2a in parallel, providing np- and $np_{key}$-parallelism. However, for a pipelined design, parallel execution also involves np and $np_{key}$ copies of all modules within the loop. As in the ciphertext addition module, all polynomials are processed with two coefficients in parallel to maximize the throughput of the NTT, and the indices are N/2 apart. The key coefficients are put in the FIFO pipelining registers 420 until they are needed for a relinearization step (multiplications between aa and $key_m$ in Relationship 2a), and the polynomials ab and bb are put in the second set of FIFO pipelining registers 422 until they are needed for the modular additions with a' and b' in Relationship 2a.

With continued reference to FIGS. 4A and 4B, and Relationship 2a, while modular multiplications and additions take operands from two different polynomials, the CRT circuits 404 and 424 and NTT circuits 406 and 426 each take two inputs from the same polynomial. The NTT circuits take input coefficients N/2 indices apart and change the order of the output coefficients such that they are pairs of sequential coefficients (i.e., 2i and 2i+1 where 0≤i<N/2). However, the iNTT takes pairs of sequential coefficients, that is, the output sequence of the NTT, and changes the order of output coefficients back so that they are separated by N/2, so that all coefficients outside the NTT domain are in the same order. The CRT and iCRT take two coefficients as inputs to match the structure of the NTT and iNTT, and both coefficients in the CRT and iCRT modules are operated upon independently. However, each CRT produces np or $np_{key}$ parallel coefficients, called RNS channels, though only a single copy is illustrated in FIG. 4A and FIG. 4B. Each iCRT requires all np or $np_{key}$ channels of a coefficient to reconstruct the output coefficient, though again only a single copy is illustrated in FIGS. 4A and 4B.

Further referring to FIGS. 4A and 4B, and Relationship 2a, values of np and $np_{key}$ change according to the number of rescale operations that have been performed on the ciphertext. For one embodiment, the modulus q decreases by $log_2$ p bits after each rescale operation, where p represents the scale. Since rescaling is included in Relationship 2a (bit shifting of a' and b' right by $log_2$ p bits), the number of rescaling operations may be equated to the number of multiplications that have been performed with the ciphertext. The initial values of np and $np_{key}$ for the selected parameters are set by the below equations, where $log_2 p_j$ is set as 59 bits for all $0 \leq j < np_{key}$. This chosen bit size for the RNS domain is set to enable native 64-bit arithmetic operations on processors but is generalizable to other bit sizes smaller than 64 bits.

$$np = \left\lceil \frac{4 + 2\log_2 q + \log_2 N}{\log_2 p_j} \right\rceil = 18$$

$$np_{key} = \left\lceil \frac{2 + \log_2 q + \log_2 Q + \log_2 N}{\log_2 p_j} \right\rceil = 26$$

Figure 5A:
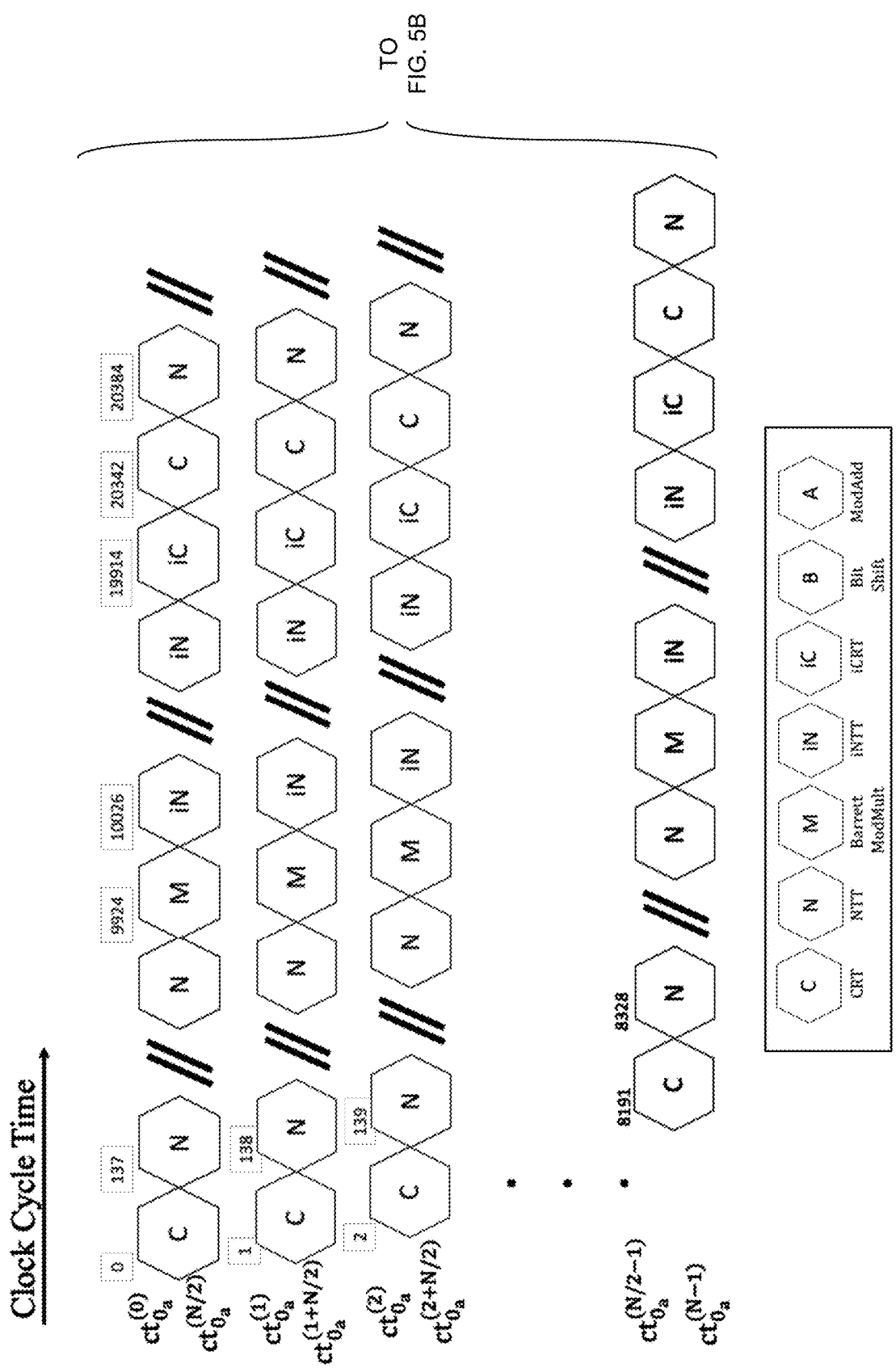
FIG. 5A illustrates a first portion of a pipeline timing diagram corresponding to the ciphertext multiplication module shown in FIGS. 4A and 4B.
Figure 5B:
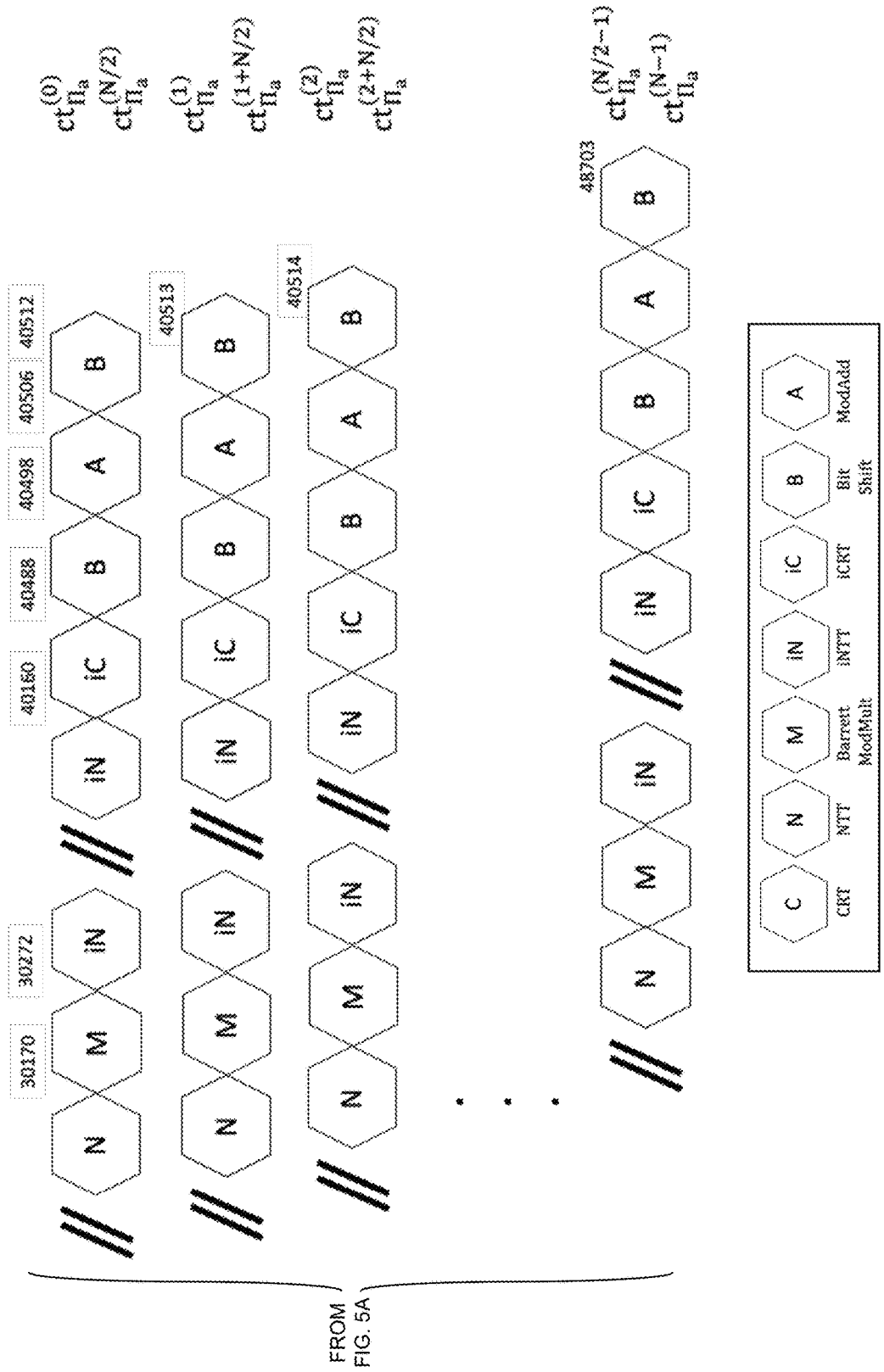
FIG. 5B illustrates a second portion of the pipeline timing diagram of FIG. 5A.

FIGS. 5A and 5B illustrate respective portions of a pipeline diagram for a critical latency of the RNS embodiment of the ciphertext multiplication module of FIGS. 4A and 4B, corresponding to Relationship 2a. The critical latency is the end-to-end path that includes polynomial aa, as it is created by multiplication of the input ciphertext polynomials and is also multiplied by the key polynomials. The double slash between hexagons is used to represent a module with a long execution time. Each cycle, a new coefficient pair is read and, after a latency of 40,513 cycles (dominated by the NTT and iNTT operations), a coefficient pair is produced. While there are $np \times np_{key}$ parallel critical latencies due to the use of RNS, only one critical latency is shown.

Further referring to FIGS. 5A and 5B, for one embodiment the ciphertext multiplication block 104 has a throughput of four coefficients per cycle and a latency of 40,513 cycles for the RNS embodiment of the ciphertext multiplication module. As in FIG. 3, the pipeline diagrams of FIGS. 5A and 5B illustrate the path of the coefficients through the ciphertext multiplication module 104, and not the actual inputs of the functions themselves. The largest contributors to the latency of the RNS embodiment are the NTT and iNTT operations. In fact, in the RNS embodiment, the two NTT and iNTT operations account for over 97% of the ciphertext multiplication cycle count. It is therefore evident that the most effective way of accelerating ciphertext multiplication is by accelerating the NTT and iNTT operations.

Figure 6B:
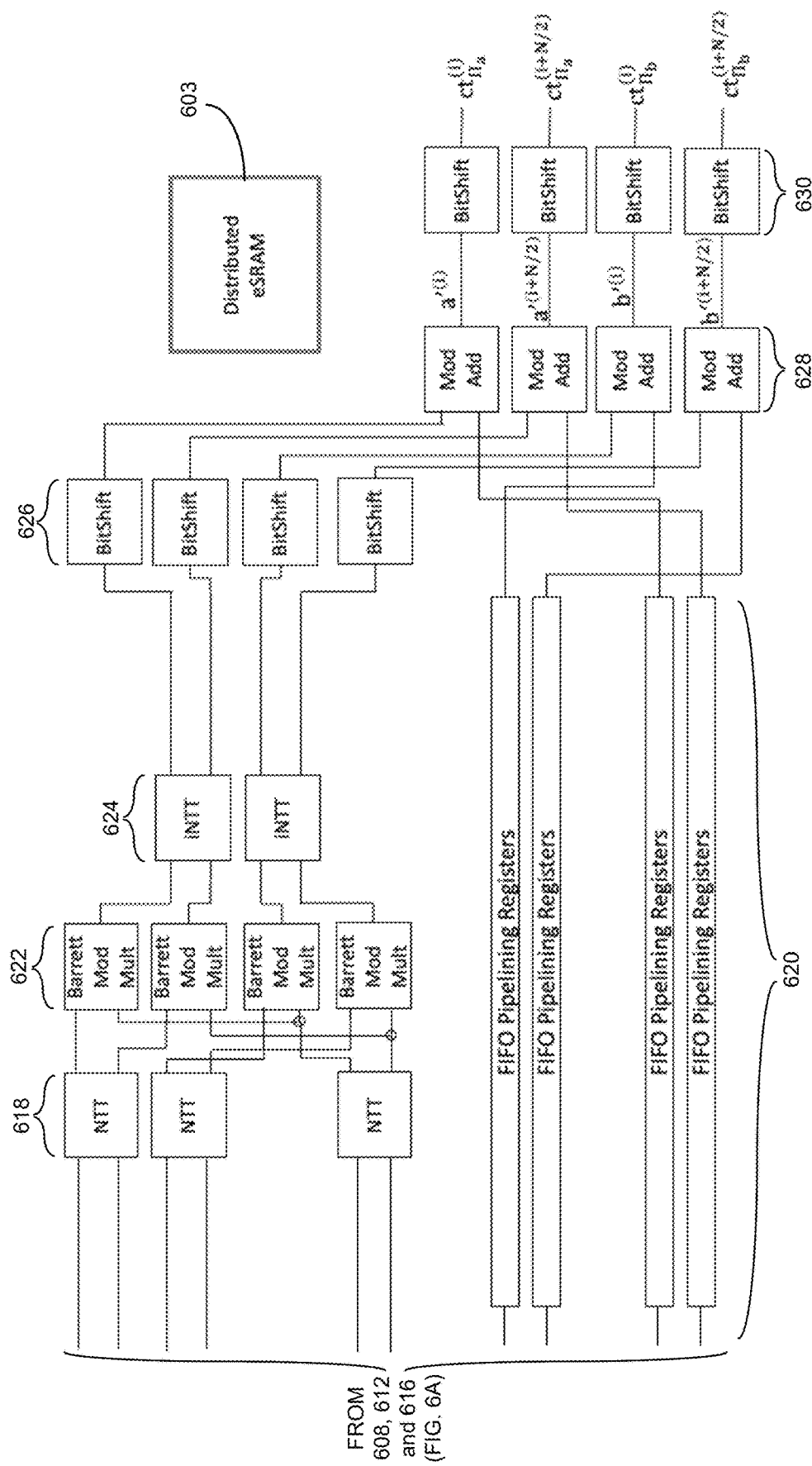
FIG. 6B illustrates a second portion of the Large Arithmetic Word Size (LAWS) ciphertext multiplication module of FIG. 6A.

Referring now to FIGS. 6A and 6B, a LAWS embodiment of a ciphertext multiplication module 600 is shown. Generally speaking, for the LAWS embodiment, ciphertext multiplication may be defined by Relationship 2b below, which corresponds to the hardware stages shown in FIGS. 6A and 6B. Two input indices, such as at 602, from each input polynomial are processed in parallel to match the throughput of an NTT function provided by a stage of NTT circuits 604, where $0 \leq i < N/2$. Key coefficients, at 606, are placed in a set of FIFO pipelining registers 608 until they are needed for a relinearization step (multiplications between aa and $key_m$ in Relationship 2b), and the polynomials ab and bb are put in a second set of FIFO pipelining registers 610 until they are needed for modular additions with a' and b' in Relationship 2b. The LAWS embodiment of the ciphertext multiplication module produces four output coefficients, or two output coefficients per output polynomial, per cycle. In this design, roots of unity generated using the modulus q are used for NTT operations to take the product of two ciphertext polynomials and roots of unity generated using the modulus Q are used for NTT operations to take the product with key polynomials. Roots of unity and other constants required for the modules shown are stored in eSRAMs, which are not shown but represented by a Distributed eSRAM module, at 603.

Further referring to FIG. 6A, the input indices, at 602, are fed to the first stage of NTT circuits 604, where an NTT operation is performed on each polynomial, followed by a multiplication by the stage of Barrett module multiplier circuits 610. For a first subset of the indices, the results of the Barrett multiplications are fed to a stage of inverse NTT modules 612 that perform an inverse NTT function. For a second subset of the indices, the results of the Barrett multiplications are fed to a stage of modular adder circuits 614, which feed an inverse NTT circuit 616. While the input indices are being processed through the various stages, the set of input keys, at 606, are temporarily queued in the FIFO pipeline registers 608.

Referring now to FIG. 6B, following being temporarily stored in the FIFO pipelining registers 608, the set of input keys is fed to a second stage of NTT circuits 618. On the same processor cycle, a first subset of the input indices is fed from the stage of iNTT circuits 612 to the second stage of NTT circuits 618 for parallel processing with the set of input keys. The remaining outputs from the iNTT circuits 612 are fed into a second set of FIFO pipelining registers 620. Similar to the processing of the input indices described above, an NTT operation is performed by the second stage of NTT circuits 618 on the input keys and lone set of indices, followed by a multiplication by a second stage of Barrett module multiplier circuits 622. The results of the Barrett multiplications are fed to a second stage of inverse NTT modules 624 that perform an inverse NTT function before passing the results to a stage of bit shift modules 626, which then provide bit-shifted results to a stage of modular adders 628. Also provided to the stage of modular adders 628 are the queued outputs from the FIFO pipelining registers 620.

Further referring to FIG. 6B, the stage of modular adder circuits 628 performs an addition function and feeds its results to a second stage of bit shift circuits 630. The stage of bit shift circuits 630 performs a bit shift operation to generate the resulting multiplier outputs. Relationship 2b below provides a more detailed functional description of how the circuitry of FIGS. 6A and 6B operate.

Relationship 2b: LAWS Ciphertext Multiplication

Inputs: $ct_0 = (ct_{0_a}, ct_{0_b})$, $ct_1 = (ct_{1_a}, ct_{1_b})$, q, Q, $key_m = (key_{m_a}, key_{m_b})$, L, p
Outputs: $ct_\Pi = (ct_{\Pi_a}, ct_{\Pi_b})$
Perform an NTT on each polynomial $ct_{0_a}, ct_{0_b}, ct_{1_a}$ and $ct_{1_b}$    [512b]
aa ← Coefficient-wise BarrettModMult of $ct_{0_a}$ and $ct_{1_a}$ mod q    [512b]
bb ← Coefficient-wise BarrettModMult of $ct_{0_b}$ and $ct_{1_b}$ mod q    [512b]
AB ← Coefficient-wise BarrettModMult of $ct_{0_a}$ and $ct_{1_b}$ mod q    [512b]
BA ← Coefficient-wise BarrettModMult of $ct_{0_b}$ and $ct_{1_a}$ mod q    [512b]
ab[j] ← ModAdd of AB and BA mod q    [512b]

| Relationship 2b: LAWS Ciphertext Multiplication | |
|---|---|
| Perform an iNTT on each polynomial aa, bb and ab | [512b] |
| Perform an NTT on each polynomial aa, $key_{m_a}$ and $key_{m_b}$ | [1,024b] |
| a' ← Coefficient-wise BarrettModMult of aa and $key_{m_a}$ mod Q | [1,024b] |
| b' ← Coefficient-wise BarrettModMult of aa and $key_{m_b}$ mod Q | [1,024b] |
| Perform an iNTT on each polynomial a' and b' | [1,024b] |
| a' ← a' » L | [1,024b] |
| b' ← b' » L | [1,024b] |
| a' ← ModAdd of a' and ab mod q | [512b] |
| b' ← ModAdd of b' and bb mod q | [512b] |
| $ct_{\Pi_a}$ = a' » $\log_2$ p | [512b] |
| $ct_{\Pi_b}$ = b' » $\log_2$ p | [512b] |

Further referring to FIGS. 6A, 6B, and Relationship 2b, the LAWS-based architecture for the ciphertext multiplication module 104 does not convert polynomial coefficients into the RNS domain and instead directly transforms them to the NTT domain to execute polynomial multiplications. Therefore, in Relationship 2b, each of the BarrettModMult function calls represents a 512-bit or 1024-bit coefficient-wise multiplication. For both Relationships 2a and 2b, any operation performed on a polynomial after a CRT conversion and before an iCRT conversion is a 64-bit operation, and any operation performed on a polynomial without undergoing a CRT conversion is a 512-bit or 1024-bit operation, depending on the modulus.

In comparing the RNS and LAWS embodiments, the main advantage of the RNS embodiment of the ciphertext multiplication module is that all modular additions and multiplications are 64-bit operations instead of 512-bit or 1024-bit operations. The main advantage of the LAWS embodiment is that all modular additions and multiplications are performed only once instead of in parallel across np or $np_{key}$ channels.

Figure 7B:
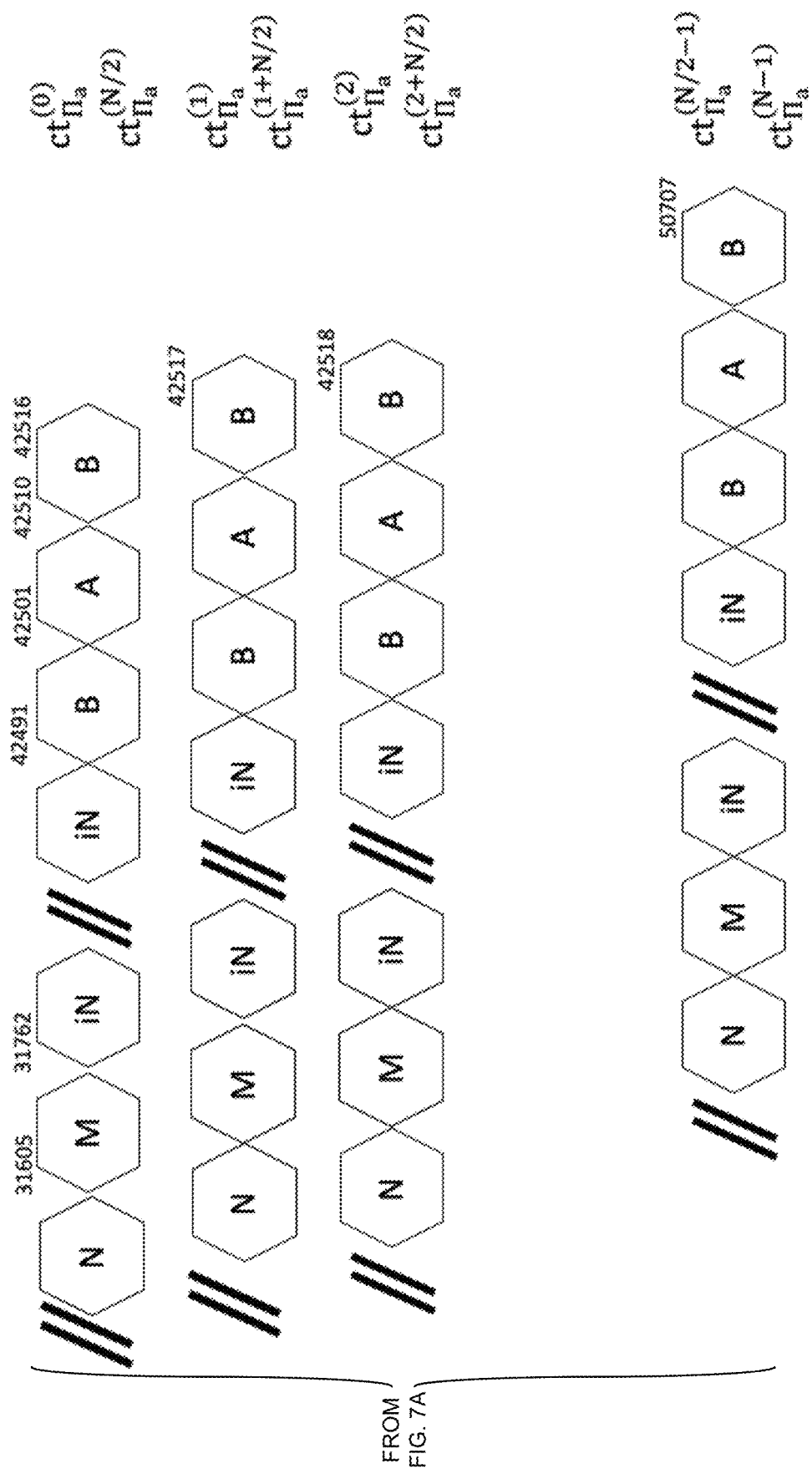
FIG. 7B a second portion of the pipeline timing diagram of FIG. 7A.

FIGS. 7A and 7B illustrate respective portions of a pipeline diagram for the critical latency of the LAWS-based ciphertext multiplication module of FIGS. 6A and 6B, corresponding to Relationship 2b. The double slash between hexagons is used to represent an operation with a long execution time. Each cycle, a new coefficient pair is read in and, after a latency of 42,517 cycles (dominated by the NTT and iNTT operations), each cycle thereafter, a coefficient pair is produced. Note that the NTT, BarrettModMult, and iNTT operations in the LAWS implementation all have longer execution times than in the RNS embodiment of FIGS. 4A and 4B, because they utilize 512-bit and 1024-bit multiplications instead of 64-bit multiplications. The largest contributors to the latency of the LAWS embodiment are the NTT and iNTT operations, as was the case for the RNS embodiment. In the LAWS embodiment, NTT and iNTT operations account for over 99% of the ciphertext multiplication cycle count. It is therefore evident that the most effective way of accelerating LAWS embodiments of ciphertext multiplication is also by accelerating the NTT and iNTT operations.

Further referring to FIGS. 7A and 7B, as in the ciphertext addition module, all polynomials are processed with two coefficients in parallel to maximize the throughput of the NTT, and the indices are N/2 apart.

Further referring to FIGS. 7A and 7B, for LAWS-based embodiments for the ciphertext multiplication module, the critical latency is the end-to-end path that includes polynomial aa, as it is created by multiplication of the input ciphertext polynomials and must also be multiplied by the key polynomials. The critical latency of the LAWS implementation is similar to that of the RNS implementation except that it does not include the CRT and iCRT modules.

Although the LAWS embodiment has fewer stages in the critical latency than the RNS embodiment, each of the modular multiplications in the RNS implementation is only 64 bits, whereas multiplications are 512-bit or 1024-bit operations in the LAWS embodiment. As the individual large bit-size operations in the LAWS embodiment have longer latencies than their RNS counterparts, there is a shorter total latency for the RNS embodiment. While the latencies of the both the RNS and LAWS embodiments are low enough to meet most application objectives, there are substantial silicon footprint (area) savings for employing the LAWS embodiment because it does not involve parallel instantiations.

Figure 8A:
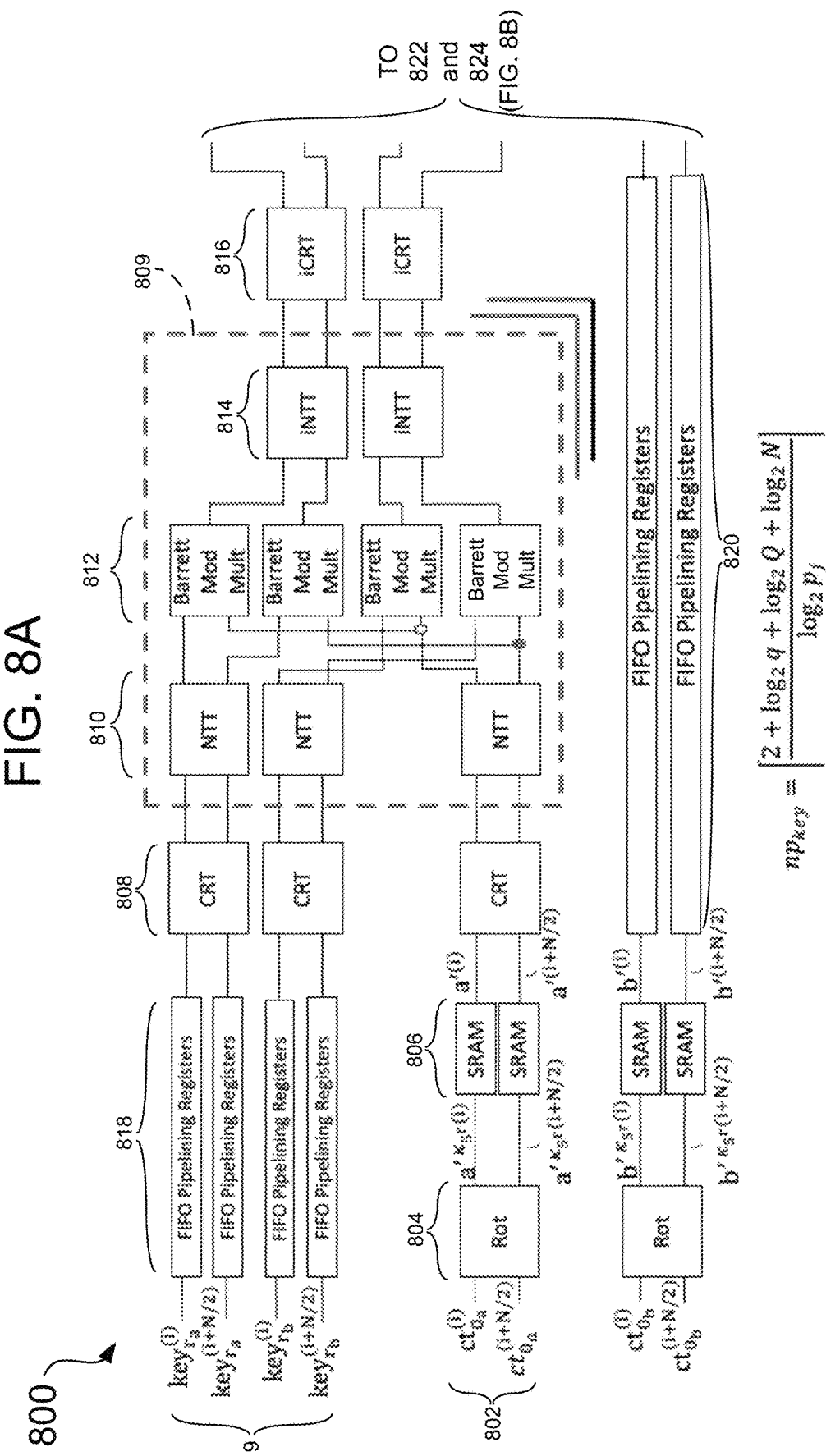
FIG. 8A illustrates a first portion of one embodiment of an RNS-based ciphertext rotation module corresponding to the ciphertext rotation module of FIG. 1.
Figure 8B:
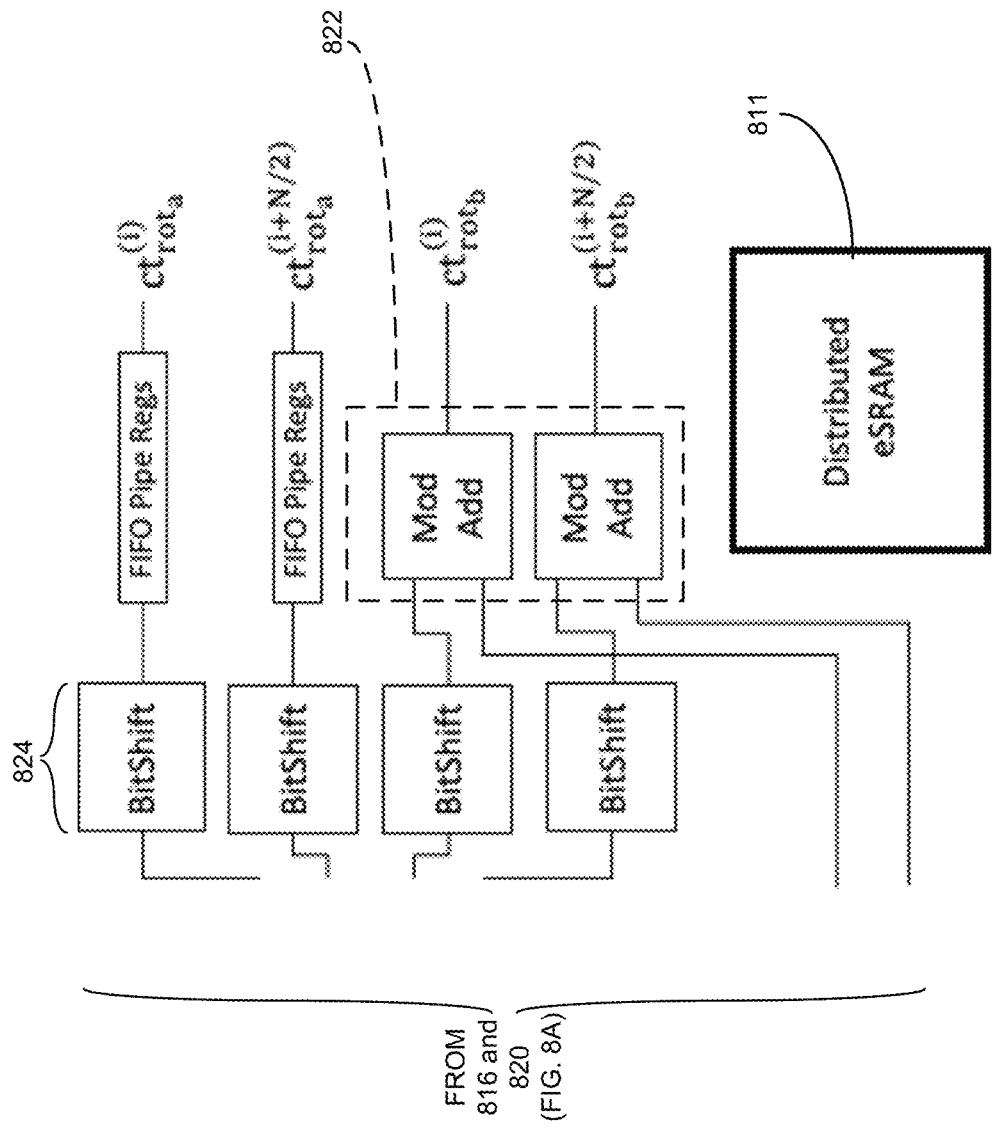
FIG. 8B a second portion of the RNS-based ciphertext rotation module of FIG. 8A.

Referring now to FIGS. 8A and 8B, one embodiment of a ciphertext rotation module 800 is shown that corresponds to the ciphertext rotation module 106 of FIG. 1. For an RNS embodiment, ciphertext rotation may be defined by Relationship 3a below, which corresponds to the hardware stages shown in FIGS. 8A and 8B.

| Relationship 3a: RNS Ciphertext Rotation | |
|---|---|
| Inputs: $ct_0 = (ct_{0_a}, ct_{0_b})$, q, Q, $key_r = (key_{r_a}, key_{r_b})$, L, $np_{key}$, r, $[p_0, p_1, \ldots, p_{np-1}, \ldots, p_{np_{key}-1}]$ | |
| Outputs: $ct_{rot} = (ct_{rot_a}, ct_{rot_b})$ | |
| a' ← $\kappa_{5^r}(ct_{0_a})$ mod q | [512b] |
| b' ← $\kappa_{5^r}(ct_{0_b})$ mod q | [512b] |
| Perform a CRT on each coefficient of a', $key_{r_a}$ and $key_{r_b}$ to convert to the RNS domain with basis $\{p_0, p_1, \ldots, p_{np_{key}-1}\}$. | [1,024b] |
| for (j = 0; j < $np_{key}$; j ← j + 1) | |
|   Perform an NTT on each polynomial a'[j], $key_{m_a}$[j] and $key_{m_b}$[j] | [64b] |
|   a''[j] ← Coefficient-wise BarrettModMult of a'[j] and $key_{m_a}$[j] mod $p_j$ | [64b] |
|   b''[j] ← Coefficient-wise BarrettModMult of a'[j] and $key_{m_b}$[j] mod $p_j$ | [64b] |
|   Perform an NTT on each polynomial a''[j] and b''[j] | [64b] |
| Perform an iCRT to reconstruct each coefficient of a'' and b'' with modulus Q using all $np_{key}$ channels of a''[0: $np_{key}$ − 1] and b''[0: $np_{key}$ − 1]. | [1,024b] |
| $ct_{rot_a}$ ← a'' » L | [1,024b] |
| b'' ← b'' » L | [1,024b] |
| $ct_{rot_b}$ ← ModAdd of b' and b''mod q | [512b] |

Generally, ciphertext rotation in an RNS context has similarities to its ciphertext multiplication counterpart, as all polynomial multiplications are performed in the NTT domain, and contains CRT transformations to perform 64-bit operations. However, for some embodiments, unlike the ciphertext multiplication module 104, there is no polynomial multiplication modulo q, only modulo Q, so all RNS domain operations are carried out with $np_{key}$-parallelism. The transformation $\kappa_{5^r}(x)$ transforms each coefficient of the input polynomial independently, where $\kappa_{5^r}(x)$ represents the transformation $f(x) \to f(x^k)$ mod @2N for k=5, co-prime with 2N.

Further referring to FIG. 8A, two input indices from each input polynomial, such as at 802, are processed in parallel to match the throughput of the NTT function, where 0≤i<N/2. A stage of rotation (Rot) circuits 804 reorders the indices of the input coefficients. For one embodiment, all output coefficient pairs from the Rot module are stored in on-chip storage, such as an embedded static random access memory (eSRAM) 806 (FIG. 8A), so that coefficient pairs can be read in a particular order as inputs for a stage of NTT circuits, at 810. For one embodiment, there are $np_{key}$ copies of respective stages of the NTT circuits 810, iNTT circuits 814, and BarrettModMult circuits 812. The modules within the dashed box, at 809, represent a single copy of a specified number of parallel copies. For one embodiment, all CRT modules, such as at 808, produce $np_{key}$ copies of each output and all iCRT modules, such as at 816, employ $np_{key}$ copies of each input. Four output coefficients, or two output coefficients per output polynomial, are produced per cycle. Roots of unity and other constants required for the modules shown are stored in eSRAMs, which are not shown but represented by a Distributed eSRAM module 811 (FIG. 8B).

With continued reference to FIGS. 8A and 8B, the stage of Rot circuits 804 corresponds to the transformation $\kappa_{5^r}$ in Relationship 3a. Each Rot circuit takes two polynomial coefficients from the same polynomial as input each cycle, though the operations on each coefficient are totally independent. Just as in the CRT and iCRT modules 808 and 816, this is done to mirror the input structure of the NTT and iNTT modules 810 and 814 and maximize their throughput. However, unlike the CRT 808 and iCRT modules 816, the Rot module 804 alters the output indices of the coefficients such that the index i is transformed to $\kappa_{5^r}(i)$ mod 2N. For one embodiment, the transformation is dependent on both r, the number of slots being rotated left, and N, the degree modulus. Since r is not a constant for all ciphertext rotation operations, the output order is not predefined. For this reason, all coefficients processed by the Rot block 804 are stored in the eSRAM 806. After a cycle in which the last rotated coefficient pair has been written to the eSRAM 806, the rotated coefficient pairs are read from the eSRAM 806 into a CRT block 808 for the RNS implementation or directly into an NTT block 1004 (FIG. 10A) for a LAWS implementation. The indices are offset by N/2, as is typical for the first stage of the NTT circuit 810. The RNS embodiment utilizes a first set of FIFO pipelining registers 818 for a set of key polynomials, at 819, so that they arrive at the key switching modules at the same time as the polynomial a', and a second set of FIFO pipelining registers 820 for the polynomial b' so that it arrives at a final modular addition stage, at 822, in sync with the outputs of the key switching, generated by a stage of bit shift circuits 824, and for the output polynomial $ct_{rot_a}$ so that it is output in sync with $ct_{rot_b}$. In FIG. 8A, just as in FIG. 4A, only one of the RNS channels is illustrated, at 809, even though there are $np_{key}$ parallel copies of the modules within the dashed box.

Figure 9A:
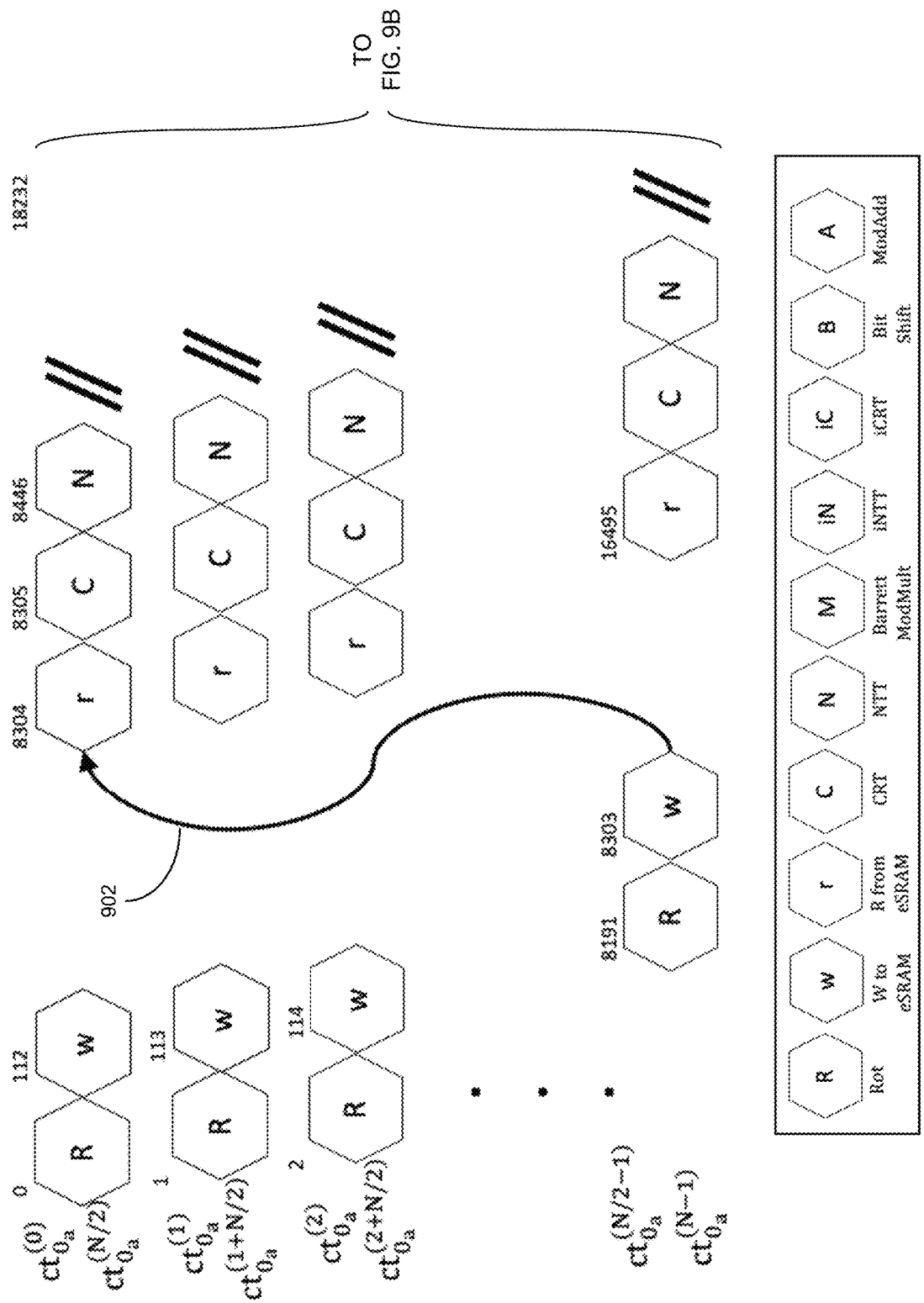
FIG. 9A illustrates a first portion of a pipeline timing diagram corresponding to the ciphertext rotation module shown in FIGS. 8A and 8B.
Figure 9B:
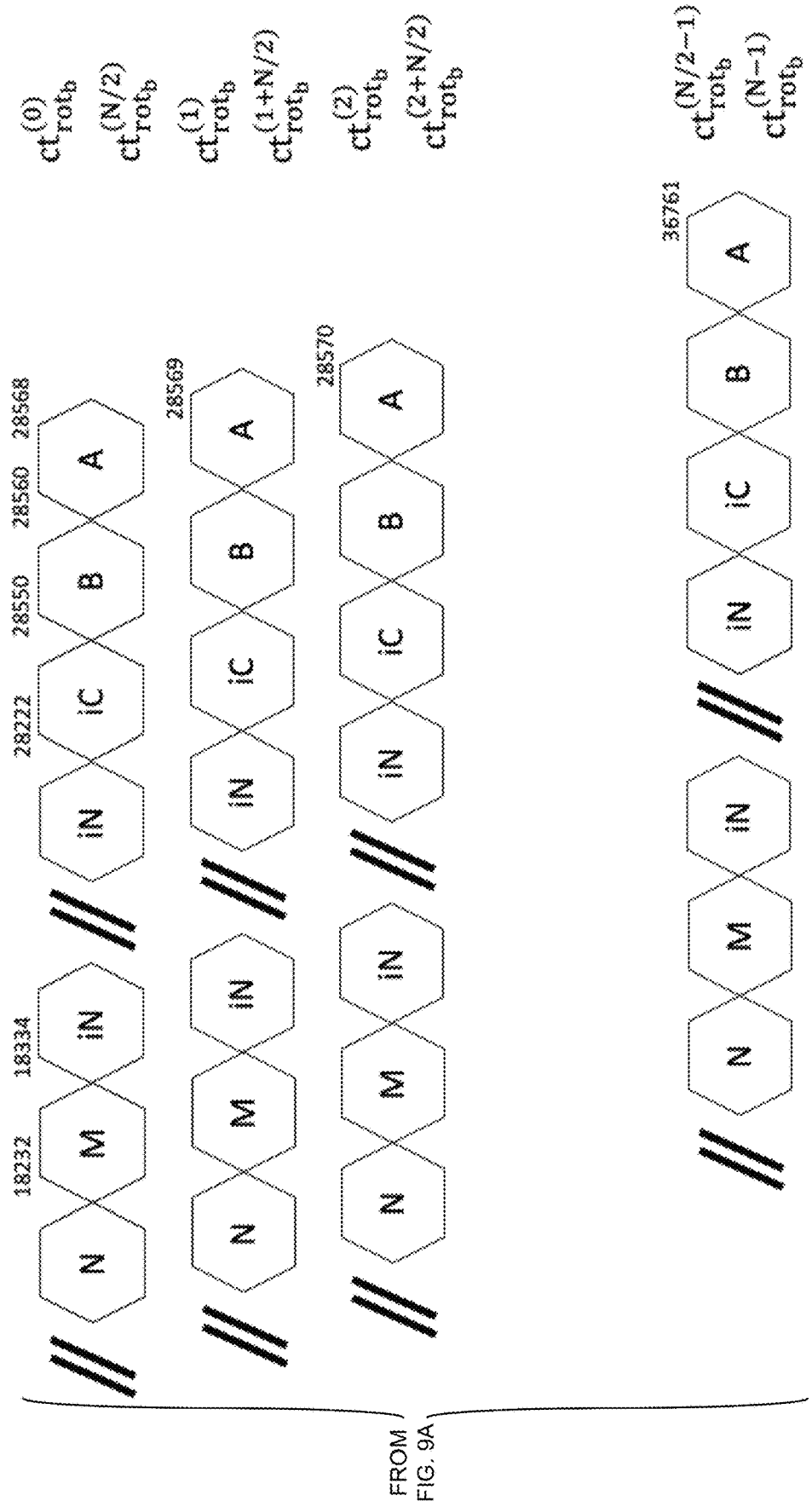
FIG. 9B a second portion of the pipeline timing diagram of FIG. 9A.

FIG. 9A illustrates a first portion of a pipeline diagram for a critical latency of the RNS embodiment of the ciphertext rotation module 800 of FIGS. 8A and 8B, corresponding to Relationship 3a. The critical latency includes polynomial a', as it is the output of the Rot block, multiplied by the key polynomials, and added to the polynomial b'. The illustration of the RNS critical latency only shows one of the critical latencies whereas there are actually $np_{key}$ parallel versions of the critical latency. The constraint that all output coefficients of the Rot module first be written to the eSRAM 806 so that they can be read out in the correct order for the NTT module 810 in the RNS embodiment is illustrated by use of an arrow, at 902, indicating that the coefficient pair (0, N/2) is read from the eSRAM the cycle after the final coefficient pair processed by the Rot module is written to the eSRAM. FIGS. 9A and 9B also illustrates how the gap between the first and last coefficient pairs being written to memory creates an unavoidable pipeline bubble in ciphertext rotation.

Further referring to FIGS. 9A and 9B, it may be seen that the ciphertext rotation block has a throughput of four coefficients per cycle and a latency of 28,569 cycles for this RNS embodiment. Once again, as in ciphertext multiplication, most of the cycles for the RNS embodiment can be attributed to the stage of NTT circuits 810 and the stage of iNTT circuits 814, as the two account for 69% of cycles in the RNS embodiment. This percentage is less than that of ciphertext multiplication because the pipeline bubble between the Rot 804 and CRT 808 or NTT 1004, in the case of the LAWS embodiment, modules contributes N/2=8,192 cycles. As in ciphertext multiplication, the most efficient way to accelerate ciphertext rotation is to accelerate the NTT 810 and iNTT 814 modules.

Figure 10A:
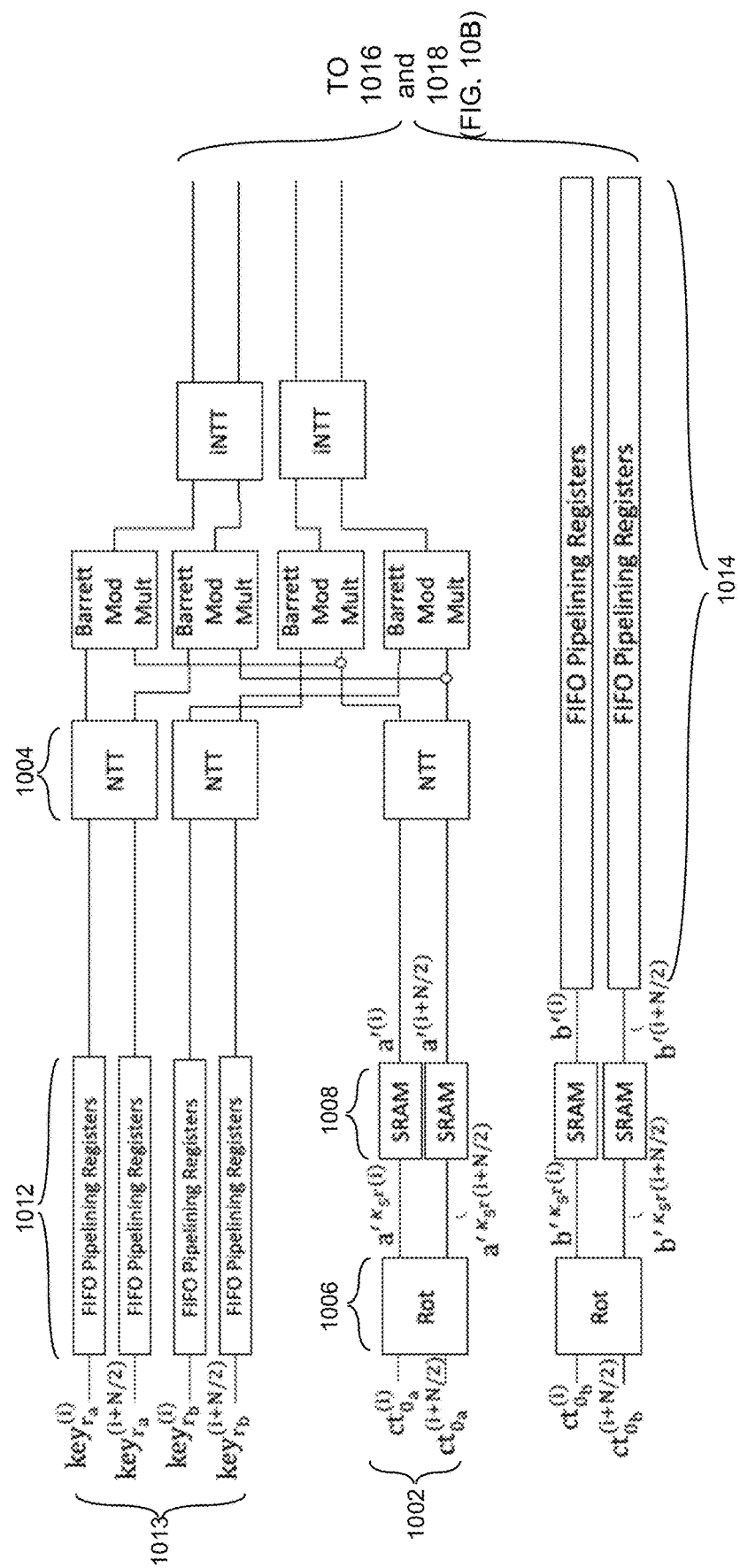
FIG. 10A illustrates a first portion of one embodiment of a LAWS-based ciphertext rotation module corresponding to the ciphertext rotation module of FIG. 1.

Referring now to FIG. 10A, a LAWS embodiment of a ciphertext rotation module 1000 is shown. For the LAWS embodiment, ciphertext rotation may be defined by Relationship 3b below, which corresponds to the hardware stages shown in FIGS. 10A and 10B. Two input indices, such as at 1002, from each input polynomial are processed in parallel to match the required throughput of an NTT function performed by a stage of NTT circuits 1004, where $0 \leq i < N/2$. A stage of rotation (Rot) circuits reorders the indices of the input coefficients, and therefore all output coefficient pairs from the stage of Rot circuits 1006 are stored in on-chip storage such as an eSRAM 1008 so that coefficient pairs can be read in the correct order as inputs for the NTT circuits 1004. The LAWS embodiment of the ciphertext rotation function produces four output coefficients, or two coefficients per output polynomial, per cycle. Roots of unity and other constants required for the modules shown are stored in eSRAMs, which are not shown but represented by a Distributed eSRAM module 1010.

| Relationship 3b: LAWS Ciphertext Rotation | |
|---|---|
| Inputs: $ct_0 = (ct_{0_a}, ct_{0_b})$, q, Q, $key_r = (key_{r_a}, key_{r_b})$, L, r | |
| Outputs: $ct_{rot} = (ct_{rot_a}, ct_{rot_b})$ | |
| a' ← $\kappa_{5^r}(ct_{0_a})$ mod q | [512b] |
| b' ← $\kappa_{5^r}(ct_{0_b})$ mod q | [512b] |
| Perform an NTT on each polynomial a', $key_{r_a}$ and $key_{r_b}$ | [1,024b] |
| a" ← Coefficient-wise BarrettModMult of a' and $key_{m_a}$ mod Q | [1,024b] |
| b" ← Coefficient-wise BarrettModMult of a' and $key_{m_b}$ mod Q | [1,024b] |
| Perform an iNTT on each polynomial a" and b" | [1,024b] |
| $ct_{rot_a}$ ← a" » L | [1,024b] |
| b" ← b" » L | [1,024b] |
| $ct_{rot_b}$ ← ModAdd of b' and b" mod q | [512b] |

Similar to the RNS embodiment, the stage of Rot circuits 1006 in FIG. 10A corresponds to the transformation $\kappa_{5^r}$ in Relationship 3b and takes two polynomial coefficients from the same polynomial as input each cycle, though the operations on each coefficient are totally independent. Also, as in the RNS embodiment, a first set of FIFO pipelining registers 1012 are employed for the key polynomials, at 1013, so that they arrive at the key switching modules at the same time as the polynomial a', and a second set of FIFO pipelining registers 1014 for the polynomial b' so that it arrives at a final modular addition stage, at 1016, in sync with the outputs of the key switching, generated by a stage of bit shift circuits 1018, and for the output polynomial $ct_{rot_a}$ so that it is output in sync with $ct_{rot_b}$.

Figure 10B:
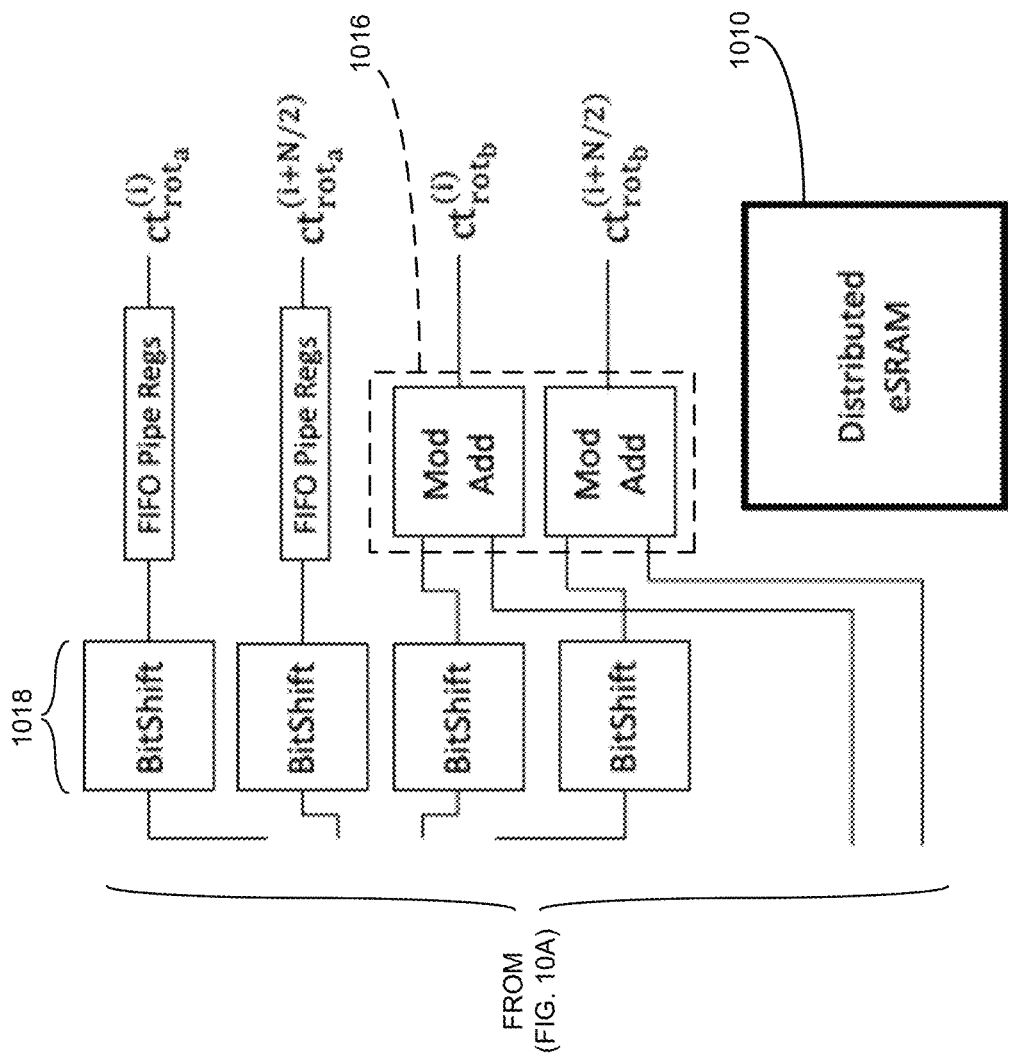
FIG. 10B illustrates a second portion of the LAWS-based ciphertext rotation module of FIG. 10A.

FIGS. 11A and 11B illustrate a pipeline diagram for a critical latency of the LAWS embodiment of the ciphertext rotation module 1000 of FIGS. 10A and 10B, corresponding to Relationship 3b. Like the RNS embodiment, the critical latency for the LAWS embodiment is the one that includes polynomial a', as it is output of the Rot block, multiplied by the key polynomials, and added to the polynomial b'. The critical latency of the LAWS embodiment is similar to that of the RNS implementation except that it does not include the CRT and iCRT modules. A constraint that all output coefficients of the Rot module 1006 are first written to the eSRAM 1008 so that they can be read out in the correct order for the NTT module in both the RNS and LAWS implementations is illustrated by use of an arrow, at 1102, indicating that the coefficient pair (0, N/2) is read from the eSRAM the cycle after the final coefficient pair processed by the Rot module 1006 is written to the eSRAM 1008. FIGS. 11A and 11B also illustrate how the gap between the first and last coefficient pairs being written to memory creates an unavoidable pipeline bubble in ciphertext rotation.

As further shown in FIGS. 11A and 11B, the LAWS embodiment of the ciphertext rotation module 1000 exhibits a latency of 29,780 cycles. The double slash between hexagons is used to represent an operation with a long execution time. Each cycle, a new coefficient pair is read in and, after the latency of 29,780 cycles, each cycle a coefficient pair is also produced. As the number of cycles reduced by not performing CRT or iCRT conversions in the LAWS embodiment is offset by larger bit-size multiplications, the LAWS implementation has a slightly longer execution time than the RNS embodiment.

Figure 12:
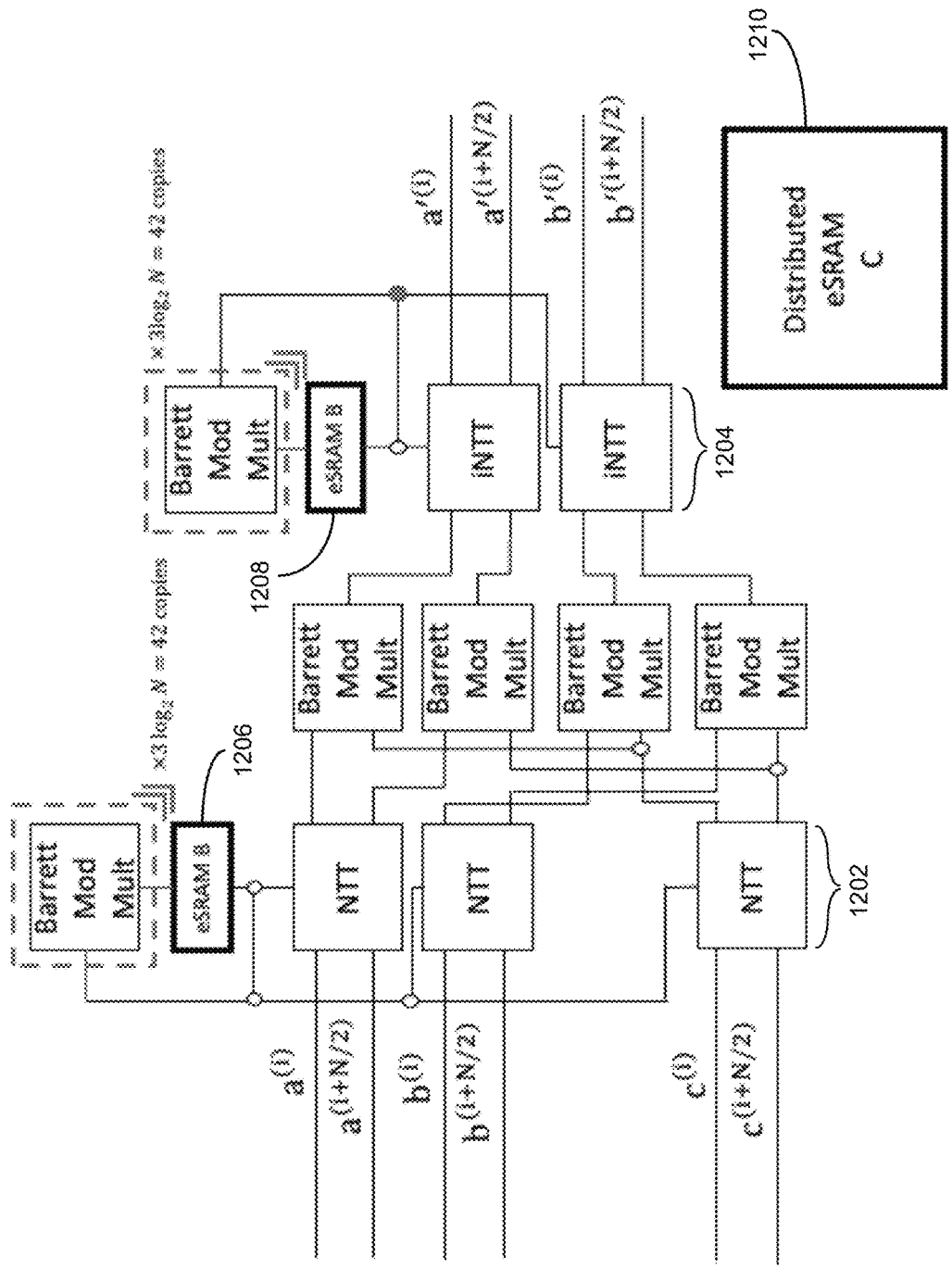
FIG. 12 illustrates one embodiment of a LAWS-based circuit having an NTT and iNTT with eSRAM blocks for storing roots of unity.

FIG. 12 illustrates one embodiment of a stage of NTT circuits 1202 and a stage of iNTT circuits 1204 with eSRAM blocks 1206 and 1208 for storing roots of unity in a LAWS architecture. The eSRAM blocks 1206 and 1208 are used for storing roots and inverse roots of unity while a distributed eSRAM C block 1210 represents many smaller eSRAMs that store other constants. In an RNS architecture, the eSRAM B blocks 1206 and 1208 would also be connected to np or $np_{key}$ parallel copies of all shown modules. Each wire represents a 1024-bit bus, and the 3 $\log_2$ N modular multipliers associated with each eSRAM B block are used for on-the-fly root of unity generation (three multipliers per each of the log N stages within an NTT or iNTT circuit). Multiple eSRAM A blocks (not shown) are used to store ciphertext or key polynomials that are used as inputs to ciphertext addition, ciphertext multiplication, or ciphertext rotation modules.

As noted in the various embodiments described above, the ciphertext multiplication, addition and rotation modules operate in a fully-pipelined manner to carry out ciphertext computations in an efficient manner. With typical ciphertexts and key coefficients often being hundreds to thousands of bits wide, employing a suitable memory architecture for storing constants and coefficients used in the computations is an important consideration. In one specific embodiment, wide memory devices such as those that are compliant with the High Bandwidth Memory 2 standard (such as HBM2Es), with 1024-bit wide buses, are utilized to transfer 512-bit ciphertext coefficients from external memory to on-chip memory during processing. All on-chip eSRAM blocks are 2048-bits or 1024-bits wide, enabling the transfer of multiple 512-bit intermediate ciphertext coefficients or 1024-bit key coefficients per cycle. By reading out entire word lines of large-width memories each cycle, the cryptographic processor employs a unique memory architecture strategy that enables the deeply pipelined design to be continuously fed with new inputs and thereby produces new outputs each cycle.

Figure 13:
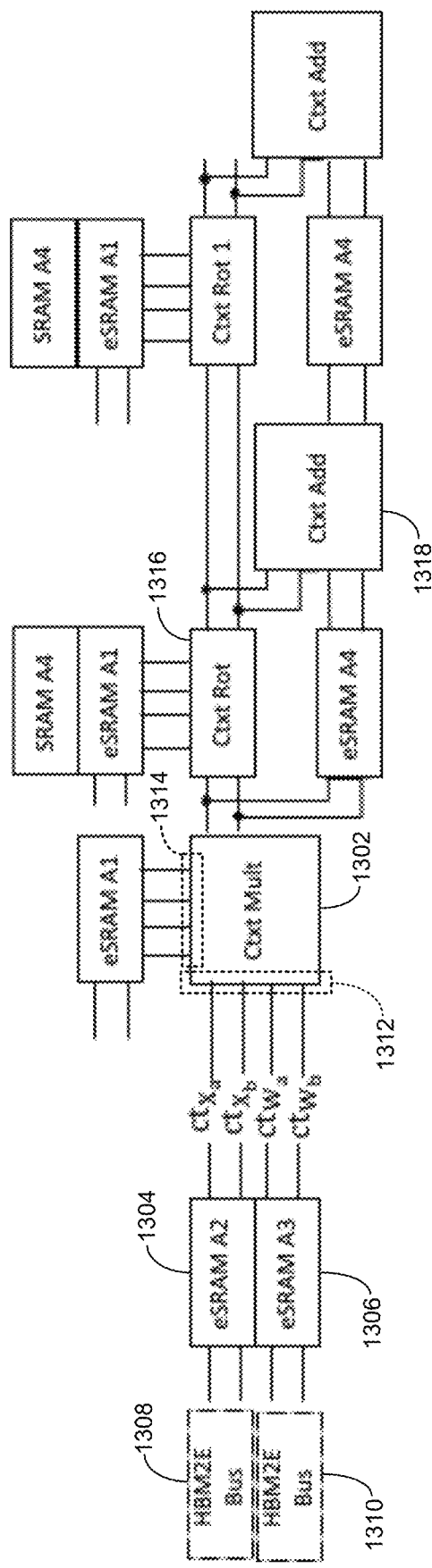
FIG. 13 illustrates a further embodiment of a cryptographic processing circuit.

FIG. 13 illustrates one embodiment of a ciphertext processing circuit 1300, showing a ciphertext multiplication module 1302 that is coupled to multiple on-chip eSRAM blocks 1304 and 1306. External memory in the form of High Bandwidth Memory (HBM) devices 1308 and 1310 deliver at least one entire ciphertext or key coefficient to the on-chip eSRAM memory per cycle. The ciphertext multiplication module 1302 also includes a memory interface 1312 that matches the wide width of the eSRAMs to receive at least one given entire ciphertext coefficient per cycle, and to receive at least one given entire key coefficient per cycle via the interface 1314. The ciphertext multiplication module dispatches a multiplication result via one or more output interfaces that have the same width as the input interfaces 1312 and 1314 per cycle. Additional processing modules such as rotation modules 1316 and addition modules 1318 may be interconnected to the multiplication module 1302, along with further distributed on-chip eSRAM devices.

Various further details related to the various embodiments described above are presented below. Cycle counts for each of these modules with the required input bit sizes, obtained from Verilog simulations, are used to determine the relative performance of the RNS and LAWS embodiments of the benchmark discussed below. All modules discussed below also utilize constants for their execution that are stored in the distributed eSRAM blocks described above. For our purposes, we assume that any required constants are always available when needed.

In some embodiments, the CRT and iCRT modules may be implemented with ModAdd and BarrettModMult modules. Furthermore, as the iCRT employs a conditional subtraction, pipelining registers may be used so that values arrive at the output after the same number of cycles regardless of whether a condition is executed. As a result, the designs presented offer constant execution time, which offers security advantages. These registers may be utilized since, in a pipelined implementation, the number of cycles required for an operation must always be predetermined. Both algorithms were implemented such that operations were performed in parallel across all RNS channels. This parallelism involved the instantiation of np or $np_{key}$ copies of all modular multiplication, multiplication, reduction, and modular addition modules within parallel loop iterations. The latency of the CRT module is therefore the sum of the latencies of a multiplication, $\log_2$ np or $\log_2 np_{key}$ additions, and a Barrett reduction. The latency of the iCRT module is the sum of the latencies of a BarrettModMult, a multiply, $\log_2$ np or $\log_2 np_{key}$ modular additions, a Barrett reduction, and a modular subtraction. As the iCRT operation uses more modular operations, its latency is almost double that of the CRT module.

Both algorithms also employ some constants in addition to the moduli q or Q and the basis of prime moduli $\{p_j\}$. In one embodiment employing 64-bit moduli for the RNS domain, the CRT uses a precomputed array of length $$W = \frac{\log_2 q}{64} \text{ or } W = \frac{\log_2 Q}{64}$$

for each prime modulus in the RNS basis called $TB_{CRT_j}$; where $TB_{CRT_j}[k]=64k$ mod $p_j$ for $0 \leq j < np$ or $np_{key}$ and $0 \leq k < W$. The iCRT uses constants $P=\Pi_{j=0}^{np-1} p_j$ for input coefficients mod q or $P=\Pi_{j=0}^{np_{key}-1} p_j$ for coefficients mod Q, as well as $$P_{div_j} = \frac{P}{p_j}, \text{ and } P_{inv_j} = \left(\frac{P}{p_j}\right)^{-1} \mod p_j.$$

A copy of each of these sets of constants is stored in an eSRAM for all ciphertext multiplication and rotation operations when implementing an RNS version of the accelerator.

As all moduli are predetermined, it is assumed these constants have been generated before inference begins, so their computation is not included in the presented cycle count.

The NTT and iNTT may be implemented with a feedforward architecture. For one embodiment, a 2-parallel radix-2 implementation of the NTT is employed, and an on-the-fly root of unity generation scheme is used to save eSRAM area. However, it is assumed that all stored roots of unity have been generated before inference begins and therefore their generation does not contribute to the presented cycle count. Each NTT and iNTT circuit uses $\log_2 N$ stages of $N/2$ butterflies each, and the iNTT employs an additional modular multiply by $N^{-1}$ after the last stage. There is no simple relation between the roots of unity required for the NTT and the inverse roots of unity required for the iNTT, so each of these sets of values are stored separately.

The latency of a feedforward implementation of the NTT or iNTT is dominated by pipelining registers that are utilized, along with MUXs, to align the correct inputs to each stage of the transformation within an NTT or iNTT circuit. For a radix-2 implementation of the transformation, the total number of cycles across all stages is $$\frac{N}{2} - 1 = 8,$$

191 for the chosen parameters. In some embodiments, the NTT may be implemented with a Cooley-Tukey butterfly and the iNTT may be implemented with a Gentleman-Sande butterfly. An efficient way to accelerate the NTT or iNTT is by performing more butterfly operations in parallel, which can be done by doubling the radix or doubling the number of butterflies used at each stage. Each doubling of the radix or number of butterflies approximately halves the number of pipelining cycles, up to a maximum radix or parallelism of $N/2$. At this point there will be no pipelining registers in the design, and the latency of the NTT will be determined by the $N/2$ modular multiplies (or $N/2+1$ modular multiplies for the iNTT) from the two butterfly types. However, as all modules in the design are structured to mirror the input structure of the NTT and iNTT, if we increased the number of parallel modules or the radix then we would also need to change the input and output structures of all other modules and memories. Additionally, all multiplications and additions use the same BarrettModMult and ModAdd blocks as described above. All butterfly operations for the NTT and iNTT in the RNS implementation in one embodiment may use 64-bit operands, and all butterfly operations for the NTT and iNTT in the LAWS implementation in another embodiment may use 512-bit or 1024-bit operands.

The rotation of an input ciphertext $ct_0 = (ct_{0_a}, ct_{0_b})$ to the left by r slots was computed with Relationship 4, presented below. The relationship is the same for both RNS and LAWS embodiments. A pre-computed rotation power, $R = 5^r \mod 2N$, is used for any given rotation but, as it is possible to perform $$\frac{N}{2} - 1$$

rotations, it is impractical to store all the corresponding keys and R values. We adopt an approach in which only rotation keys and constants where r is a power of 2 are stored by default. While all other modules compute only changes to polynomial coefficients, the rotation module also computes changes to the coefficient indices; the rearrangement of indices during NTTs and iNTTs is dictated by the lengths of the pipelining registers and arrangement of the MUXs. The latency of the rotation module is determined by the combined latencies of a BarrettModMult, which will be 64 bits because the coefficient addresses are guaranteed to be less than 64 bits by the DPRIVE parameter range ($2^9 \leq N \leq 2^{14}$) and an extension to the DPRIVE parameter range that may be required to support CKKS boostrapping ($2^{15} \leq N \leq 2^{17}$), and a modular subtraction. As the else conditions in Relationship 4 contain a modular subtraction and the if conditions contain an assignment, the if conditions must be pipelined to match the latency of the else conditions so that the latency of the rotation module is constant regardless of which condition is executed.

| Relationship 4: Rotation |
| --- |
| Inputs: $ct_{0_a}^{(i)}$, $ct_{0_a}^{(i+N/2)}$, i, q, N, R |
| Outputs: $a^{\kappa_{5^r}(i)}$, $a^{\kappa_{5^r}(i+N/2)}$ |
| pow(i) ← BarrettModMult of R and i mod 2N |
| pow(i + N/2) ← BarrettModMult of R and (i + N/2) mod 2N |
| if ($\kappa_{5^r}$ (i) < N) |
|   $\kappa_{5^r}$ (i) ← pow(i)                                         [64b] |
|   $a^{\kappa_{5^r}(i)}$ ← $ct_{0_a}^{(i)}$                                   [512b] |
| else |
|   $\kappa_{5^r}$ (i) ← ModSub of pow(i) − N mod N     [64b] |
|   $a^{\kappa_{5^r}(i)}$ ← ModSub of $0 - ct_{0_a}^{(i)}$ mod q     [512b] |
| if($\kappa_{5^r}$(i + N/2) < N) |
|   $\kappa_{5^r}$(i + N/2) ← pow(i + N/2)                    [64b] |
|   $a^{\kappa_{5^r}(i+N/2)}$ ← $ct_{0_a}^{(i+N/2)}$                          [512b] |
| else |
|   $\kappa_{5^r}$(i + N/2) ← ModSub of pow(i + N/2) − N mod N   [64b] |
|   $a^{\kappa_{5^r}(i+N/2)}$ ← ModSub of $0 - ct_{0_a}^{(i+N/2)}$ mod q   [512b] |

For the BarrettModMult module, all moduli by powers of 2 are realized without any logical gates using the proper wiring connections. Barrett reduction uses a constant $$T = \left\lfloor \frac{2^{2u}}{q} \right\rfloor$$

where $u = \lfloor \log_2 q \rfloor + 1$, meaning a different value of T is stored for each modulus used during a modular multiply or reduction. In an RNS implementation, modular multiplies use one of the RNS basis primes $\{p_j\}$ as a modulus, meaning that $np_{key}$ values of T are stored. Additionally, the iCRT contains a single reduction modulo q, meaning that a different value of T is stored for each of the levels of the logistic regression algorithm. The LAWS implementation of Barrett reduction requires the storage of a value of T based on q for each level of an implemented algorithm as well as a single value of T based on Q, which is invariant. Both implementations also use one further value of T for the reduction modulo 2N in Relationship 4. It should be noted that the bit size of T is the same as the bit size of the modulus that is used to compute T. All T values computed from $\{p_j\}$ and 2N are 64 bits, all T values computed from q are 512 bits, and T computed from Q is 1,024 bits in one embodiment with the previously stated parameter choices. An array multiplier, referred to below, is used to implement all multiplications found. The latency of the BarrettModMult is the combined latency of three multiplications, two bit shifts, and two subtractions. As the latencies of multiplications and bit shifts both depend on the size of the modulus, the BarrettModMult has different latencies for RNS and LAWS implementations.

Bit shifting was implemented using a pipelined logarithmic funnel shifter built from a tree of MUXs. As the name implies, the logarithmic funnel shifter takes $\log_2 n$ cycles to perform a bit shift of n bits, also corresponding to a floored division by $2^n$.

Most blocks in the ciphertext multiplication and rotation modules are NTTs, INTTs, CRTs, iCRTs, and BarretMod-Mults. All NTT and iNTT butterflies contain a modular multiply coupled with a modular addition or subtraction. Additionally, the CRTs and iCRTs are mainly composed of multiplications and reductions, which also involve multiplications. Therefore, the ciphertext multiplication and rotation operations are dominated by multiplication modules. The only functions not involving multiplications are bit shifts, described above, and ciphertext additions.

Based on a comparison among popular large integer multipliers for cryptographic applications, we elect to implement the schoolbook multiplier as a shift-and-add array multiplier. The schoolbook multiplier is chosen because it strikes a compromise between high operating frequency and low gate complexity and therefore low area footprint.

The schoolbook multiplier computes all partial products in parallel using MUXs and uses an adder tree to sum the partial products using the adder module described below. As the adder tree requires $\log_2 n$ stages, where n is the bit size of the operands, the latency of each multiply is proportional to the logarithm of the operand bit size. This proportional latency explains why the RNS implementations of individual operations have faster execution times than the LAWS latencies, because each 64-bit multiplication is approximately $$\frac{\log_2 512}{\log_2 64} = 1.5\times$$

faster than a 512-bit multiplication and approximately 1.7× faster than a 1024-bit multiplication.

For modular addition and subtraction modules, a modified pipelined ripple-carry adder is employed, which has been reported to implement large integer multiplications on an Intel Arria 10 FPGA, fabricated using TSMC's 20 nm technology process. This reported design computes an addition or subtraction in a fixed latency of 4 cycles for a range of operand bit widths from 260 bits to 2,052 bits, and is able to perform a 1,028-bit addition at a frequency of 554 MHz. We therefore assume that the additions in our design, which have a minimum size of 64 bits and do not exceed 2,052 bits, also have a fixed latency of 4 cycles. A modular addition is implemented by an addition followed by a conditional subtraction, and a modular subtraction is implemented by a subtraction followed by a conditional addition. The overall latency of the modular addition or subtraction is therefore 9 cycles, as one cycle is needed to evaluate the Boolean condition.

The modified pipelined ripple-carry adder also includes register duplication to ensure drive strength for large fanouts, which can lead to signal propagation delays and ultimately cause timing violations. A large fanout is important to consider for the addition module because the multiplication module is primarily constructed from addition modules, and the multiplication module forms the basic building block of most other modules described above.

The RNS embodiment of each of ciphertext addition, multiplication, and rotation using the modules listed above was designed using Verilog and was simulated with Mentor Modelsim version 10.7c. A known-answer-test for each of these operations was then run using known input ciphertexts, output ciphertexts, keys, and constants, and the cycle counts for each module were recorded. The individual blocks required for the LAWS implementation were simulated and, because all modules in our design have parameterizable input sizes and constant throughput, it is possible to determine the latency for LAWS implementations of all the constituent modules of the logistic regression inference benchmark.

A summary table comparing latencies for each ciphertext function in RNS and LAWS implementations along with their performances relative to a minimum DPRIVE 1,024-point logistic regression inference execution time are included in Table 1. The results show that the overall logistic regression latency is dominated by ciphertext rotations and the RNS implementation is only faster than the LAWS implementation by about 4%. Both implementations achieve a latency over 1.1×faster than the maximum execution time of 0.1 ms per inference specified by DPRIVE at an operating frequency of 600 MHz.

Given that it is possible to compute a 1,028-bit addition on an FPGA fabricated with a 20 nm process in 4 cycles at a frequency of 554 MHz, consequently our 1,024-bit additions can be executed in 4 cycles at a frequency of 600 MHz on an ASIC fabricated using a 7 nm or 5 nm CMOS technology process. Note that our multiplier module is built solely from MUXs and addition modules, so in justifying our cycle count for additions at the chosen operating frequency we are also able to justify our cycle count for multiplications.

The ciphertext addition, multiplication, and rotation cycle counts in Table 1 refer to the number of cycles required to produce the first output coefficients. The total pipeline delay refers to the total number of cycles to produce the first output coefficients for the logistic regression inference model, and the total latency to process the ciphertext refers to the number of cycles before all coefficients have been output. The operating frequency was determined such that both the RNS and LAWS implementations would meet the DPRIVE target execution time given their total execution cycles. The inferences per ciphertext are based on the batch size, or number of test set examples packed in each ciphertext for N=16,384, and delay per inference refers to the amortized inference time at the listed operating frequency.

TABLE 1

Performance summaries of RNS and LAWS performances for 1024-point logistic regression inference benchmark with N = 16,384 relative to DPRIVE target performance of 0.1 ms per inference

|  | RNS | LAWS |
| --- | --- | --- |
| Ciphertext addition (cycles) | 9 | 9 |
| Ciphertext multiplication (cycles) | 40,513 | 42,517 |
| Ciphertext rotation (cycles) | 28,569 | 29,780 |
| Total pipeline delay (cycles) | 407,337 | 425,459 |
| Total latency to process ciphertext (cycles) | 415,528 | 433,650 |
| Operating frequency (MHz) | 600 | 600 |
| Inferences per ciphertext | 8 | 8 |
| Delay per inference (ms) @ 600 MHz | 0.087 | 0.090 |
| Acceleration vs. DPRIVE maximum delay | 1.16× | 1.11× |

The largest amount of eSRAM storage space for constants for both the RNS and LAWS implementations of the design is occupied by the roots and inverse roots of unity for the NTT and iNTT modules. Each NTT and iNTT uses N distinct roots of unity, which are accessed in a predefined pattern determined by a corresponding state machine address generator. However, it is not possible to store these roots of unity in register banks in each NTT and iNTT module because, unlike moduli which remain constant throughout a module's execution, in each cycle a single butterfly may need access to a different root of unity. The roots must therefore be stored in dedicated eSRAM blocks for each NTT and iNTT. However, because NTTs and iNTTs are executed in parallel and synchronously on multiple polynomials, the same roots and inverse roots will be used in the same order for all parallel transformations. For example, in FIG. 4A, a single eSRAM can be used to store the roots of unity for the NTTs on $ct_{0_a}$, $ct_{0_b}$, $ct_{1_a}$, and $ct_{1_b}$ because all four transformations will use the same roots of unity delivered to parallel butterflies during the same cycle. Similarly, the same eSRAM can be used to store the inverse roots of unity for the iNTTs on aa and bb, but a separate block of memory is used for ab because it is out of sync with aa and bb. FIG. 12 illustrates the use of eSRAMs for storing roots of unity for an NTT and iNTT in a LAWS implementation in which the same eSRAM is used for NTT operations on sample polynomials a, b, and c and iNTT operations on polynomials a' and b'. Again, this use of a single eSRAM is possible because the NTT and iNTT are synchronous transformations of the same length with the same modulus, and therefore need to access the same roots and inverse roots of unity in the same order and at the same time.

While storing a single set of roots of unity for synchronous transformations somewhat reduces the required storage for the NTT and iNTT, the size of N still means that thousands of values must be stored in internal memory. However, "on-the-fly" root of unity generation may be used, in which a subset of roots and inverse roots of unity are stored on-chip and all other roots are generated as modular products of the stored roots. While it is relatively simple to ensure that all roots are generated by the cycle in which they are required because the length of each multiplication is known beforehand, the real cost of on-the-fly root of unity generation is the number of additional modular multiplications, and hence additional transistors, that are required to generate the roots that are not stored. If N/n roots of unity are stored in eSRAM, then n−1 sequential modular multiplications are required to compute any missing root of unity per each of the log N stages within an NTT or iNTT circuit, where n≥1. We find that the optimal number of roots to store in eSRAM that minimizes total core area for both RNS and LAWS embodiments of the design, including the area from transistors to compute the missing roots, is N/4. Therefore N/4 roots and inverse roots of unity are stored in eSRAM for each set of parallel NTTs or iNTTs.

Note that for the LAWS implementation of ciphertext multiplication, only two sets of roots and inverse roots of unity are stored, meaning only four sets of modular multipliers are required to generate the missing roots and inverse roots. Additionally, for the RNS implementations of ciphertext multiplications and rotations, np and $np_{key}$ sets of roots and inverse roots of unity are stored, and np and $np_{key}$ sets of modular multipliers are used to compute the missing roots. FIG. 12 also shows the modular multipliers used to generate the missing roots and inverse roots above the eSRAM storing the roots in a LAWS implementation. With our chosen parameters, up to three multipliers are required for each of the $\log_2$ N=14 stages to generate a missing root.

Though our design is for the simplest of the DPRIVE benchmarks and does not address bootstrapping, the most complex module, it is worth remembering that the performance was stated for an operating frequency of 600 MHz. The maximum operating frequency of HBM2E, a high bandwidth memory (HBM) that may be used to feed the first input stage of the design, is 1.6 GHz and the operating frequency of HBM3, the next generation of the technology, will be 4.2 GHz. Assuming the limiting external factor for the clock rate of the design will be the ability to deliver input ciphertexts from the HBM to the on-chip eSRAM, it would be possible to double the clock frequency of the design to 1.2 GHZ, thereby approximately halving the number of modules to achieve the same performance with approximately half the stated area. For example, at 600 MHz we use 10 ciphertext rotation tiles for the matrix-vector multiplication portion of logistic regression, but if we were to use a clock frequency of 1.2 GHz it would be possible to achieve the same performance with only 5 ciphertext rotation tiles, using each remaining tile twice at double the speed (assuming arithmetic blocks are not rate-limiting). However, though the area for ciphertext rotation tiles would be halved, the eSRAMs required for rotation key storage could not be reduced, meaning that the total area savings from doubling the clock rate would be less than half. The newly available area could be used for bootstrapping tiles or additional memories required to implement the remaining two DPRIVE challenge application benchmarks. Additionally, doubling the clock frequency could also be used to reduce the supply voltage while maintaining the desired performance, thereby reducing the power consumption of the processor.

Similarly, if an HBM3 external memory were employed, it would also be possible to increase the operating frequency to 4.2 GHz and obtain 7 times the stated performance without increasing the on-chip area (again, assuming the arithmetic blocks could support this operating frequency). Therefore, by utilizing the available area or by taking advantage of opportunities for time-multiplexing modules by increasing the operating frequency, we not only demonstrate that it is possible to achieve the logistic regression inference benchmark target with our proposed RNS or LAWS design embodiments using either a 7 nm or 5 nm CMOS technology process, but the targets for the convolutional neural network (CNN) inference and training DPRIVE benchmarks can be met as well. Furthermore, as the ciphertext addition, ciphertext multiplication, and ciphertext rotation modules are functionally equivalent for different fully-homomorphic encryption (FHE) mathematical foundations, and ciphertexts and keys are also the same size in different mathematical foundations, our proposed RNS and LAWS embodiments are equally valid for hardware accelerators supporting other arithmetic FHE schemes, such as BGV and BFV. Furthermore, those skilled in the art will appreciate direct relevance to accelerating execution times for applications in the domain of secure search, labelled PSI, etc. We also believe our proposed embodiments are valid for any future variations of the aforementioned schemes or new schemes that are composed of the modular arithmetic operations described above, and are not limited to the arrangement of the blocks in FIGS. 4A, 4B, 6A, 6B 8A, 8B, 10A, and 10B so long as they are deeply pipelined and throughput-matched to the radix or parallelism of the NTT blocks.

In terms of efficiency comparisons, a cryptographic processor employing an RNS architecture to execute a 1,024-point logistic regression benchmark including the ciphertext addition, multiplication and rotation modules, running at a frequency of 600 MHz, achieves a latency 192.6 times faster than an Intel Xeon Platinum 8175 processor with 128 GB of RAM running at 3.1 GHz (a clock rate over five times faster). Similarly, a cryptographic processor employing a LAWS architecture for to execute the same 1,024-point logistic regression benchmark including the ciphertext addition, multiplication and rotation modules, running at a frequency of 600 MHZ, achieves a latency 186.2 times faster than an Intel Xeon Platinum 8175 processor with 128 GB of RAM running at 3.1 GHz (a clock rate over five times faster).

Those skilled in the art will appreciate that the embodiments described above enable fully-pipelined ciphertext processing modules that may be employed in a cryptographic processor to achieve performance parameters for handling encrypted data operations that are comparable to processing parameters associated with unencrypted data processing operations.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '$\overline{\text{signalname}}$') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A cryptographic processor, comprising:
a cryptographic processing circuitry configured to operate in one of at least two modes of operation;
wherein for a first mode of operation, the cryptographic processing circuitry is configurable as a Residue Number System (RNS) architecture to perform a first logic operation on a first set of received ciphertext input symbols; and
wherein for a second mode of operation, the cryptographic processing circuitry is configurable as a Large Arithmetic Word Size (LAWS) architecture to perform a second logic operation on a second set of received ciphertext input symbols.

2. The cryptographic processor of claim 1, wherein:
for the first mode of operation and the second mode of operation, the cryptographic processing circuitry is configured with at least one non-multiplier processing stage.

3. The cryptographic processor of claim 2, wherein:
for the first mode of operation, the cryptographic processing circuitry is configured with at least one Chinese Remainder Theorem (CRT) processing stage.

4. The cryptographic processor of claim 3, wherein:
for the first mode of operation, the cryptographic processing circuitry comprises multiple processing slices defining multiple processing channels, each channel to perform operations on signals that are 64-bits wide or less concurrently with other processing channels of the multiple processing channels.

5. The cryptographic processor of claim 4, wherein:
for the first mode of operation, each channel to perform operations on the signals that are 64-bits wide or less independently from the other processing channels of the multiple processing channels.

6. The cryptographic processor of claim 2, wherein:
for the first mode of operation or the second mode of operation, the cryptographic processing circuitry is configured with at least one Number Theoretic Transform (NTT) processing stage.

7. The cryptographic processor of claim 6, wherein:
for the second mode of operation, the cryptographic processing circuitry includes a single processing slice defining a single processing channel to perform operations on signals that are at least 64-bits wide.

8. An integrated circuit (IC) chip, comprising:
cryptographic processing circuitry;
wherein for a first mode of operation, the cryptographic processing circuitry is configured as a Residue Number System (RNS) architecture to perform a first logic operation on a first set of received ciphertext input symbols; and
wherein for a second mode of operation, the cryptographic processing circuitry is configured as a Large Arithmetic Word Size (LAWS) architecture to perform a second logic operation on a second set of received ciphertext input symbols.

9. The IC chip of claim 8, wherein:
for the first mode of operation and the second mode of operation, the cryptographic processing circuitry is configured with at least one non-multiplier processing stage.

10. The IC chip of claim 9, wherein:
for the first mode of operation, the cryptographic processing circuitry is configured with at least one Chinese Remainder Theorem (CRT) processing stage.

11. The IC chip of claim 10, wherein:
for the first mode of operation, the cryptographic processing circuitry comprises multiple processing slices defining multiple processing channels, each channel to perform operations on signals that are 64-bits wide or less concurrently with other processing channels of the multiple processing channels.

12. The IC chip of claim 11, wherein:
for the first mode of operation, each channel to perform operations on the signals that are 64-bits wide or less independently from the other processing channels of the multiple processing channels.

13. The IC chip of claim 9, wherein:
for the first mode of operation or the second mode of operation, the cryptographic processing circuitry is configured with at least one Number Theoretic Transform (NTT) processing stage.

14. The IC chip of claim 13, wherein:
for the second mode of operation, the cryptographic processing circuitry comprises a single processing slice defining a single processing channel to perform operations on signals that are at least 64-bits wide.

15. A method of operation in an integrated circuit (IC) chip that includes cryptographic processing circuitry, the method comprising:
configuring during a first mode of operation, the cryptographic processing circuitry into a Residue Number System (RNS) architecture to perform a first logic operation on a first set of received ciphertext input symbols; and
configuring, during a second mode of operation, the cryptographic processing circuitry into a Large Arithmetic Word Size (LAWS) architecture to perform a second logic operation on a second set of received ciphertext input symbols.

16. The method of claim 15, wherein:
for the first mode of operation and the second mode of operation, the configuring of the cryptographic processing circuitry comprises configuring the cryptographic processing circuitry with at least one non-multiplier processing stage.

17. The method of claim 16, wherein:
for the first mode of operation, the configuring of the cryptographic processing circuitry comprises configuring the cryptographic processing circuitry with at least one Chinese Remainder Theorem (CRT) processing stage.

18. The method of claim 16, wherein:
for the first mode of operation or the second mode of operation, the configuring of the cryptographic processing circuitry comprises configuring the cryptographic processing circuitry with at least one Number Theoretic Transform (NTT) processing stage.

19. The method of claim 16, wherein:
for the first mode of operation, the configuring of the cryptographic processing circuitry comprises configuring the cryptographic processing circuitry with multiple processing slices defining multiple processing channels, each channel to perform operations on signals that are 64-bits wide or less concurrently with other processing channels of the multiple processing channels; and
for the second mode of operation, the configuring of the cryptographic processing circuitry comprises configuring the cryptographic processing circuitry with a single processing slice defining a single processing channel to perform operations on signals that are at least 64-bits wide.

* * * * *